United States Patent
Itaya

(10) Patent No.: US 12,523,684 B2
(45) Date of Patent: Jan. 13, 2026

(54) VOLTAGE MANAGEMENT DEVICE, VOLTAGE COMMAND DEVICE, POWER SYSTEM MONITORING SYSTEM, MEASUREMENT DEVICE, VOLTAGE MANAGEMENT METHOD, AND STORAGE MEDIUM

(71) Applicant: Mitsubishi Electric Corporation, Tokyo (JP)

(72) Inventor: Nobuhiko Itaya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 387 days.

(21) Appl. No.: 18/261,888

(22) PCT Filed: Feb. 26, 2021

(86) PCT No.: PCT/JP2021/007352
§ 371 (c)(1),
(2) Date: Jul. 18, 2023

(87) PCT Pub. No.: WO2022/180787
PCT Pub. Date: Sep. 1, 2022

(65) Prior Publication Data
US 2024/0077523 A1 Mar. 7, 2024

(51) Int. Cl.
*G01R 19/25* (2006.01)
*G01R 19/06* (2006.01)
*H02J 13/00* (2006.01)

(52) U.S. Cl.
CPC ............. *G01R 19/25* (2013.01); *G01R 19/06* (2013.01); *H02J 13/00001* (2020.01); *H02J 13/00002* (2020.01)

(58) Field of Classification Search
CPC .... G01R 19/25; G01R 19/06; G01R 19/2513; H02J 13/00001; H02J 13/00002; H02J 3/00; H02J 13/00
See application file for complete search history.

(56) References Cited

U.S. PATENT DOCUMENTS

2003/0117089 A1* 6/2003 Tyson ................ H05B 41/2883
315/316
2004/0195097 A1* 10/2004 Suzuki ............... G01N 27/4071
204/426

(Continued)

FOREIGN PATENT DOCUMENTS

JP      2012217248 A    11/2012
JP      2015109737 A     6/2015

(Continued)

OTHER PUBLICATIONS

International Search Report (PCT/ISA/210) with English translation and Written Opinion (PCT/ISA/237) mailed on May 11, 2021, by the Japanese Patent Office as the International Searching Authority for International Application No. PCT/JP2021/007352.

(Continued)

*Primary Examiner* — Ziaul Karim
(74) *Attorney, Agent, or Firm* — BUCHANAN, INGERSOLL & ROONEY PC

(57) ABSTRACT

A voltage management device according to the present disclosure includes a communication unit that obtains, for each of sections in a power system, a measurement value of a voltage measured by a smart meter connected to that section, where the sections are generated by segmentation between monitoring points, and a voltage estimation unit that estimates, for each of the sections, a voltage drop quantity and a voltage rise quantity in that section using the measurement value.

13 Claims, 12 Drawing Sheets

(56) References Cited

U.S. PATENT DOCUMENTS

| | | | | |
|---|---|---|---|---|
| 2009/0243548 | A1* | 10/2009 | Hoff | H02J 7/007184 |
| | | | | 320/161 |
| 2011/0018515 | A1* | 1/2011 | Mccloy-Stevens | ............................ |
| | | | | H02M 3/1588 |
| | | | | 323/284 |
| 2016/0231756 | A1* | 8/2016 | Baerthlein | G05F 1/16 |
| 2019/0098723 | A1* | 3/2019 | Sadwick | H05B 45/3725 |
| 2019/0173412 | A1* | 6/2019 | Kawazu | B60W 20/50 |
| 2023/0291204 | A1* | 9/2023 | Yin | H02J 3/18 |
| 2023/0412274 | A1* | 12/2023 | Nazarathy | H04B 10/516 |

FOREIGN PATENT DOCUMENTS

| | | |
|---|---|---|
| JP | 6452909 B1 | 1/2019 |
| WO | 2019150586 A1 | 8/2019 |

OTHER PUBLICATIONS

Examination Report No. 1 dated May 15, 2024, issued in the corresponding Australian Patent Application No. 2021429428, 3 pages.

* cited by examiner

FIG.6

|   | 0:00-00:30 | ... | 23:30-24:00 |
|---|---|---|---|
| a | a1 | ... | a48 |
| F | F1 | ... | F48 |
| g | g1 | ... | g48 |
| L | L1 | ... | L48 |

FIG.8

| TIME RANGE | | ... | t1 | t1+Δt | ... |
|---|---|---|---|---|---|
| MONITORING POINT #1 | MEASUREMENT INFORMATION FOR USE IN ESTIMATION | ... | P1(t1), Q1(t1) V1(t1) P2(t1), Q2(t1) V2(t1) | | ... |
| | MAXIMUM RISE QUANTITY (WITHIN SECTION) | ... | ΔVmax(t1) | | ... |
| | MAXIMUM DROP QUANTITY (WITHIN SECTION) | ... | ΔVmin(t1) | | ... |
| | PROPER VOLTAGE RANGE — VOLTAGE UPPER LIMIT VALUE | ... | 107−ΔVmax(t1) | | ... |
| | PROPER VOLTAGE RANGE — VOLTAGE LOWER LIMIT VALUE | ... | 95+ΔVmin(t1) | | ... |
| | MEASUREMENT VALUE AT MONITORING POINT | ... | V1(t1) | | ... |

|  |  | MONITORING POINT #1 | MONITORING POINT #2 | ... |
|---|---|---|---|---|
| PROPER VOLTAGE RANGE | UPPER LIMIT VALUE | 106V | 107V | ... |
|  | LOWER LIMIT VALUE | 98V | 98V | ... |

VOLTAGE MANAGEMENT DEVICE, VOLTAGE COMMAND DEVICE, POWER SYSTEM MONITORING SYSTEM, MEASUREMENT DEVICE, VOLTAGE MANAGEMENT METHOD, AND STORAGE MEDIUM

FIELD

The present disclosure relates to a voltage management device, a voltage command device, a power system monitoring system, a measurement device, a voltage management method, and a storage medium, each for monitoring a voltage of a power system.

BACKGROUND

A power distribution system generally includes a high-voltage system and a low-voltage system. A power receiving end of a general consumer is connected to this low-voltage system. Electric utility companies are required to maintain the voltage at the power receiving end of a general consumer within a proper voltage range. The voltage is required to be maintained, by way of example, within a range from 95 V to 107 V for 100 V power reception. Electric utility companies therefore provide monitoring and control, including monitoring the voltage of the high-voltage system using a measurement device that measures the voltage of the high-voltage system, and adjustment of the amount of control to be applied by a voltage controller connected to the high-voltage system using a measurement value of the voltage of the high-voltage system.

A study has recently progressed on a centralized control method in place of conducting local monitoring and control at each location of a power distribution system. A centralized control method provides monitoring and control of the voltage of a power distribution system over the entire system. Monitoring and controlling of a power distribution system requires to know the voltage distribution over the power distribution system. Patent Literature 1 discloses a technology to estimate the voltage distribution of a power distribution system through utilization of an amount of electricity metered by a smart meter.

CITATION LIST

Patent Literature

Patent Literature 1: Japanese Patent Application Laid-open No. 2015-109737

SUMMARY OF INVENTION

Problem to be Solved by the Invention

However, large numbers of loads and power generation facilities are connected to the low-voltage system in a section generated by segmentation between monitoring points. Nevertheless, topology information and impedance information in the low-voltage system have not yet been computerized in general, thereby making it difficult to estimate a voltage drop and a voltage rise using amounts of electricity.

The present disclosure has been made in view of the foregoing, and it is an object of the present disclosure to provide a voltage management device capable of estimating a voltage drop and a voltage rise occurring in a section generated by segmentation between monitoring points.

Means to Solve the Problem

In order to solve the above-described problem and achieve the object, a voltage management device according to the present disclosure includes: an acquisition unit to obtain, for each of sections in a power system, a measurement value of a voltage measured by a voltage measurement device connected to a corresponding one of the sections, the sections being generated by segmentation between monitoring points; and a voltage estimation unit to estimate, for each of the sections, a voltage drop quantity and a voltage rise quantity in the corresponding one of the sections using the measurement value.

Effects of the Invention

A voltage management device according to the present disclosure is advantageous in capability of estimating a voltage drop and a voltage rise occurring in a section generated by segmentation between monitoring points.

BRIEF DESCRIPTION OF DRAWINGS

FIG. 6 is a diagram illustrating an example of estimation information of the first embodiment.

FIG. 8 is a diagram illustrating a method for calculating a proper voltage range of the first embodiment.

DESCRIPTION OF EMBODIMENTS

A voltage management device, a voltage command device, a power system monitoring system a measurement device, a voltage management method, and a storage medium according to embodiments will be described in detail below with reference to the drawings.

First Embodiment

Figure 1:
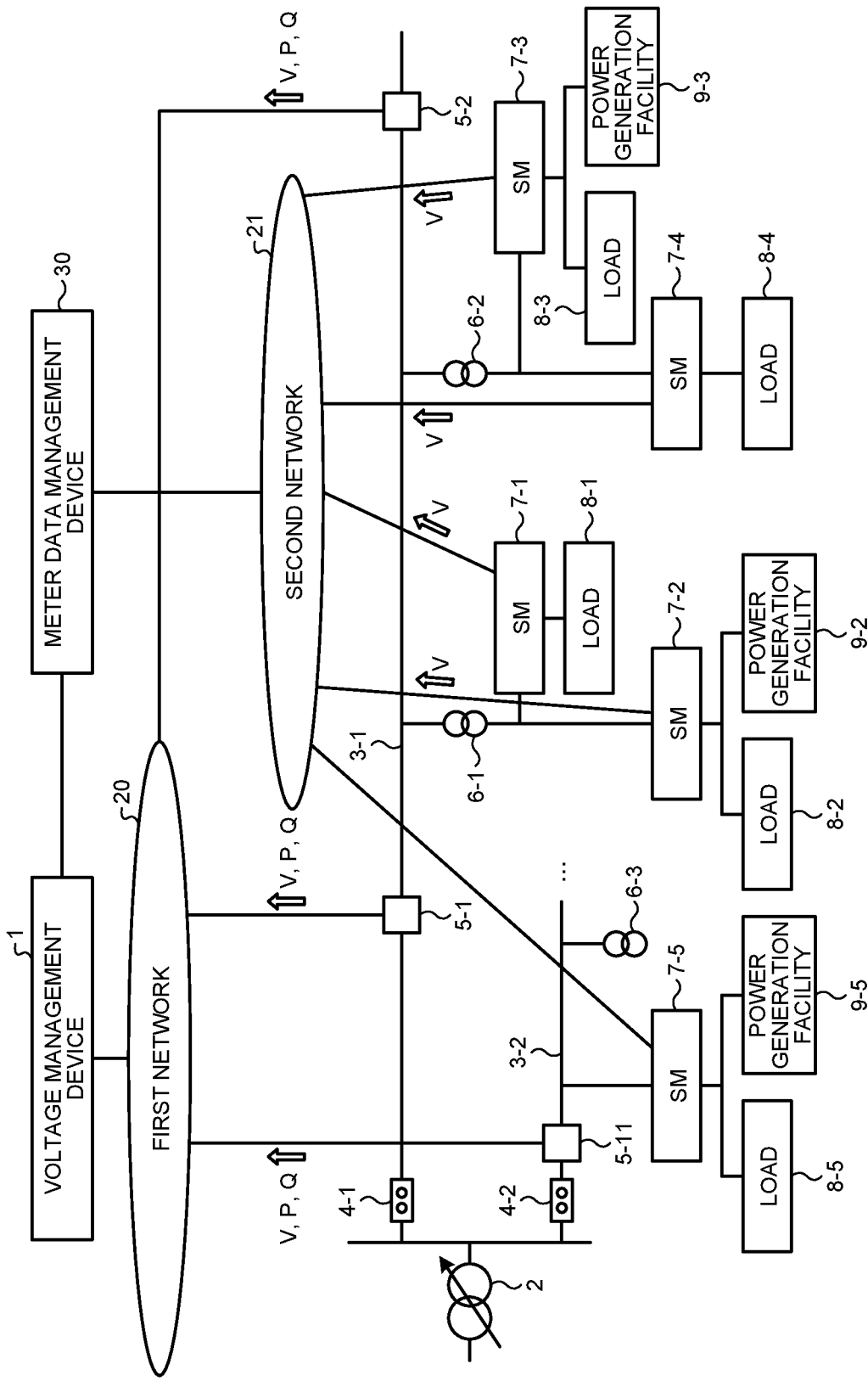
FIG. 1 is a diagram illustrating an example configuration of a voltage management device according to a first embodiment and a power system to be monitored.

FIG. 1 is a diagram illustrating an example configuration of a voltage management device according to a first embodiment and a power system to be monitored. The present embodiment will be described with respect to an example in which a voltage management device 1 monitors a power distribution system, which is an example of the power system. As illustrated in FIG. 1, the power distribution system to be monitored by the voltage management device 1 includes a distribution transformer 2 and power distribution lines 3-1 and 3-2 each connected to a secondary bus of the distribution transformer 2. The distribution lines 3-1 and 3-2 are each a distribution line of a high-voltage system. Note that the high-voltage system has a voltage of, e.g., 6600 V, and the low-voltage system generally has a voltage ranging from 100 V to 200 V, but the specific voltage values are not limited to the values of this example.

A circuit breaker 4-1 and sensor-integrated switchgears 5-1 and 5-2 are installed on the distribution line 3-1, and a circuit breaker 4-2 and a sensor-integrated switchgear 5-11 are installed on the distribution line 3-2. The sensor-integrated switchgears 5-1 and 5-2 are each a switchgear that functions as a measurement device that measures active power (total three-phase active power flow), reactive power (total three-phase reactive power flow), and a voltage (average three-phase voltage) of the distribution line 3-1, and make and break the electrical path of the distribution line 3-1 corresponding thereto. Similarly, the sensor-integrated switchgear 5-11 is a switchgear that functions as a measurement device that measures active power, reactive power, and a voltage of the distribution line 3-2, and makes and breaks the electrical path of the distribution line 3-2 corresponding thereto. The locations of installation of the sensor integrated switchgears 5-1, 5-2, and 5-11 are examples of monitoring points where the corresponding voltages of the distribution lines 3-1 and 3-2 are monitored. The sensor-integrated switchgears 5-1, 5-2, and 5-11 transmit measurement values of active power (indicated by P in FIG. 1), reactive power (indicated by Q in FIG. 1), and a voltage (indicated by V in FIG. 1) as measurement information to the voltage management device 1 via a first network 20. The first network 20 is, for example, but not limited to, an optical communication line.

The sensor-integrated switchgears 5-1, 5-2, and 5-11 and similar other sensor-integrated switchgears are each hereinafter referred to as sensor-integrated switchgear 5 when no particular distinction is made, and the distribution lines 3-1 and 3-2 are each hereinafter referred to as distribution line 3 when no particular distinction is made. Although not illustrated, other sensor-integrated switchgears 5 are further connected to the distribution line 3-1 at positions nearer to the termination end than the sensor-integrated switchgear 5-2, and other sensor-integrated switchgears 5 are further connected to the distribution line 3-2 at positions nearer to the termination end than the sensor-integrated switchgear 5-11. The distribution line 3-1 is segmented by monitoring points. A region generated by segmentation between monitoring points is referred to as section. For example, in the example illustrated in FIG. 1, the portion between the sensor-integrated switchgear 5-1 and the sensor-integrated switchgear 5-2 on the distribution line 3-1 is one section.

Pole-mounted transformers 5-1 and 6-2 are connected to the distribution line 3-1 in the portion between the sensor-integrated switchgear 5-1 and the sensor-integrated switchgear 5-2, of the distribution line 3-1. In addition, a pole-mounted transformer 6-3 is connected to the distribution line 3-2. The pole-mounted transformers 6-1 and 6-2 are each hereinafter referred to as pole-mounted transformer 6 when no particular distinction is made. The pole-mounted transformer 6 is a transformer that transforms high-voltage power into low-voltage power at, e.g., 100 V or 200 V, and outputs the low-voltage power to a low-voltage distribution line. Although the example is described herein using the pole-mounted transformers 6 by way of example, the converters for transformation between a high voltage and a low voltage may be installed on the ground or in other places.

The low-voltage distribution line connected to the pole-mounted transformer 6-1 is connected with smart meters (each abbreviated to SM in the diagram) 7-1 and 7-2, loads 8-1 and 8-2, and a power generation facility 9-2. The low-voltage distribution line connected to the pole-mounted transformer 6-2 is connected with smart meters 7-3 and 7-4, loads 8-3 and 8-4, and a power generation facility 9-3. The loads 8-1 to 8-4 are devices that consume electrical power, respectively possessed by consumers #1 to #4. Consumers #1 to #4 are low-voltage consumers supplied with electricity from the low-voltage distribution line. Consumer #2 and consumer #3 have the power generation facility 9-2 and the power generation facility 9-3 respectively, and consumer #1 and consumer #4 have no power generation facilities.

The distribution line 3-2 is connected with a smart meter 7-5, a load 8-5, and a power generation facility 9-5. The load 8-5 is a load possessed by consumer #5, and consumer #5 is a high-voltage consumer supplied with electricity from a distribution line 3 of the high-voltage system. The loads 8-1 to 8-5 are each hereinafter referred to as load 8 when no particular distinction is made, and the power generation facilities 9-2, 9-3, and 9-5 are each hereinafter referred to as power generation facility 9 when no particular distinction is made.

The smart meters 7-1 to 7-5 are each a metering device installed for automatic meter reading of an amount of electricity. The smart meters 7-1 to 7-5 respectively meter apparent electricity usages of the corresponding consumers #1 to #5, and measure the voltages at interconnection points of the respective consumers #1 to #5. That is, the smart meters 7-1 to 7-5 each function as a voltage measurement device that measures the voltage on the primary side, i.e., on the power system side, with respect to the power receiving point. The smart meters 7-1 to 7-5 are each hereinafter referred to as smart meter 7 when no particular distinction is made. The apparent electricity usage is the net amount of electricity consumed by the load 8 in the cases of consumer #1 and consumer #4 having no power generation facility 9, and is the difference obtained by subtracting the amount of electricity corresponding to the electricity generated by the power generation facility 9 from the amount of electricity consumed by the load 8 in the cases of consumer #2, consumer #3, and consumer #5 having the power generation facility 9. The power generation facility 9 is a sunlight power generation facility by way of example, but may include a power generation facility other than a sunlight power generation facility. In addition, although not illustrated in FIG. 1, a power storage facility of a consumer may also be connected. A power storage facility can be considered to be similar to the load 8 during charging, and similar to the power generation facility 9 during discharging.

The smart meters 7-1 to 7-5 transmit electricity usage, i.e., the result of metering of the amount of electricity, and the result of measurement of the voltage, to a meter data management device 30 via a second network 21. The measurement result of measurement performed by each of the smart meters 7-1 to 7-5 also includes information representing the time and date associated with each measurement value. The meter data management device 30 is a device for managing a result of metering of the amount of electricity with respect to each consumer. The second network 21 is a communication network including, for example, one or more concentrators and a central unit called head end system (HES). The concentrators together form a wireless multi-hop network with multiple ones of the smart meters 7. Each of the concentrators transmits data collected from the smart meters 7 managed by the corresponding concentrator, to the central unit, and the central unit then transmits the data collected from each of the concentrators to the meter data management device 30. Note that the second network 21 is not limited to a wireless multi-hop network as described above, but may be one using power line communication, one using a mobile phone network, or one using lines of the Internet or the like. The voltage management device 1 obtains the voltage measured by each of the smart meters 7 from the meter data management device 30. Note that an example is herein described in which the voltage management device 1 obtains the voltage measured by each of the smart meters 7 via the meter data management device 30, but the voltage management device 1 may obtain the voltage measured by each of the smart meters 7 via the second network 21 without involving the meter data management device 30, or via another route not illustrated.

Although not illustrated, the pole-mounted transformer 6-3 is connected with a low-voltage distribution line, and the low-voltage distribution line is connected with smart meters 7, loads 8, and power generation facilities 9 of low-voltage consumers. In addition, the distribution lines 3-1 and 3-2 are connected with loads 8 and power generation facilities 9 of large numbers of low-voltage consumers in addition to those illustrated, via pole-mounted transformers. Moreover, the distribution lines 3-1 and 3-2 may be connected with loads 8 and power generation facilities 9 of high-voltage consumers in addition to those illustrated. Smart meters 7 are also installed in these low-voltage consumers and high-voltage consumers not illustrated. The following description assumes that a smart meter 7 is installed in all the consumers connected to the distribution lines 3-1 and 3-2. However, a smart meter 7 may be not installed in some of the low-voltage consumers. When the number of low-voltage consumers that have no smart meter 7 installed is very low among the low-voltage consumers corresponding to each section of the distribution lines 3-1 and 3-2, the voltage monitoring method of the present embodiment is applicable even when a smart meter 7 is not installed in some of the low-voltage consumers. In addition, in FIG. 1, two distribution lines 3, i.e., the distribution lines 3-1 and 3-2, are connected to the distribution transformer 2, but the number of the distribution lines 3 connected to the distribution transformer 2 may be one or three or more.

In addition, the distribution line 3 may be connected with a facility of a business operator including no load 8 but including a power generation facility 9. Also in this case, a smart meter 7 or another measurement device measures, at the interconnection point, the amount of electricity and the voltage at the interconnection point, and transmits measurement information to the voltage management device 1 via the meter data management device 30. Alternatively, the measurement information may be transmitted to the voltage management device 1 through another route without involving the meter data management device 30.

The voltage management device 1 is a voltage management device that monitors the voltage of a distribution line 3 to be monitored. Specifically, the voltage management device 1 monitors whether the voltage of a distribution line 3 at each monitoring point falls within a predetermined range. On the other hand, as described above, the voltage of a distribution line is not measured at a location other than the installation locations of the sensor-integrated switchgears 5, which are each an example of the monitoring point. Thus, no voltage drop and no voltage rise can be recognized that occur within each section generated by segmentation between monitoring points.

Figure 2:
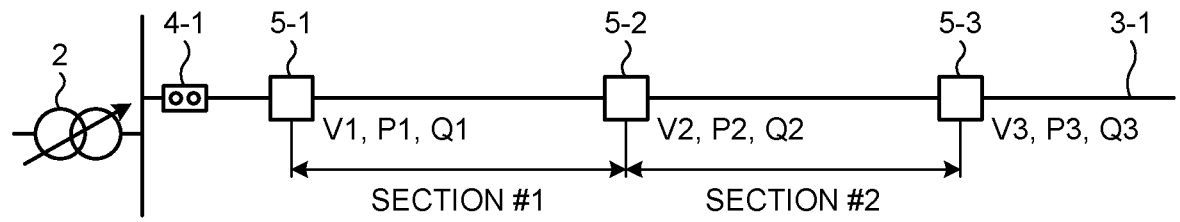
FIG. 2 is a diagram illustrating an example of section of a power distribution line of the first embodiment.

FIG. 2 is a diagram illustrating an example of the section of a distribution line 3 of the present embodiment. FIG. 2 illustrates, by way of example, section #1 and section #2 on the distribution line 3-1. Section #1 is a section between the sensor-integrated switchgear 5-1 and the sensor-integrated switchgear 5-2, and section #2 is a section between the sensor-integrated switchgear 5-2 and the sensor-integrated switchgear 5-3. A voltage, active power, and reactive power on the distribution line 3-1 are measured at the installation point of each of the sensor-integrated switchgears 5-1 to 5-3. FIG. 2 represents the voltage, the active power, and the reactive power of each of the sensor-integrated switchgears 5-1 to 5-3 as {V1, P1, Q1}, {V2, P2, Q2}, and {V3, P3, Q3}.

Regarding section #1, for example, the voltage management device 1 can recognize that the voltage at the installation location of the sensor-integrated switchgear 5-1 is V1 by obtaining measurement information of the sensor-integrated switchgear 5-1, but can recognize no voltage drop and no voltage rise that may occur in section #1. Meanwhile, electric utility companies are required to maintain the voltage at the power receiving end, i.e., the interconnection point, of a consumer within a predetermined tolerance range. In a case, for example, of 100 V power reception, the voltage is required to be maintained in a range from 95 V to 107 V. In general, an electric utility company conventionally determines a proper voltage range at the installation point of a sensor-integrated switchgear 5 by converting, into a high voltage, a range calculated by subtracting an anticipated amount of change such as a voltage drop in the low-voltage system as a fixed value, from the range of 95 V to 107 V. Note that conversion into a high voltage means that the voltage on the low-voltage side of an applicable one of the pole-mounted transformers 6 is converted into a voltage on the high-voltage side based on the tap ratio of that pole-mounted transformer 6. For example, it is conventionally assumed that a fixed voltage drop of 6 V will always occur in the low-voltage system, and thus values obtained by conversion from a range of 101 V to 107 V into a high voltage are set as the proper voltage range at the installation point of a sensor-integrated switchgear 5. The proper voltage range needs to be further narrowed when taking into consideration a voltage rise caused by a reverse power flow flowing from a power generation facility. This will make the proper voltage range of the voltage of a distribution line 3 very small, and will thus easily cause the voltage of a distribution line 3 to fall outside the proper voltage range. This will require measures to be taken such as additional installation of a voltage controller and/or installation of more lines, which will increase facility cost of the power distribution system.

Thus, in the present embodiment, the maximum values of the voltage rise and of the voltage drop in each section are estimated using the voltages measured by corresponding smart meters 7. The measurement value of the voltage may be an instantaneous value of a root mean square (RMS) value or an average value such as a one-minute average value, of the RMS value. Note that estimation of a voltage drop and a voltage rise in a section using the amounts of electricity measured by corresponding smart meters 7 requires topology information and impedance information of the facility of each consumer present in the corresponding section. However, such information is often not prepared in a form of computer-usable electronic data with respect to a low-voltage system. In addition, even in a case of high-voltage system, impedance information may be not precise. Moreover, the measurement value of a smart meter 7 is hard to obtain in real time, and even when such measurement value is obtainable in real time, monitoring using measurement information from smart meters 7 of many consumers is not practical.

In view of these, in the present embodiment, information for use in estimation of the maximum voltage rise quantity and the maximum voltage drop quantity is determined in advance for each time range, using results of measurement of the voltages from a large number of smart meters 7 installed in the corresponding section. The voltage rise quantity and the voltage drop quantity respectively represent the amount, i.e., the absolute value, of voltage rise and the amount, i.e., the absolute value, of voltage drop. Estimation information, which is information for use in estimation of the maximum voltage drop quantity and of the maximum voltage rise quantity, is, for example, information representing estimation equations for calculating the maximum voltage drop quantity and the maximum voltage rise quantity of each section using a measurement result from the sensor-integrated switchgear 5 corresponding to each section; or the maximum voltage drop quantity and the maximum voltage rise quantity themselves of each section. Then, the maximum voltage drop quantity and the maximum voltage rise quantity are estimated using the estimation information determined in advance, and the results of estimation are reflected in the proper voltage range at the upstream monitoring point, i.e., the monitoring point nearer to the distribution transformer 2, of each section. This enables a proper voltage range more suitable for the actual condition to be set for each section, and facility cost to be reduced. In addition, the estimation information can be calculated using results of past measurement of the voltages from smart meters 7, thereby eliminating the need to use measurement results from smart meters 7 in real time. Information for use in estimation of the maximum voltage drop quantity and of the maximum voltage rise quantity will be described later in more detail.

Figure 3:
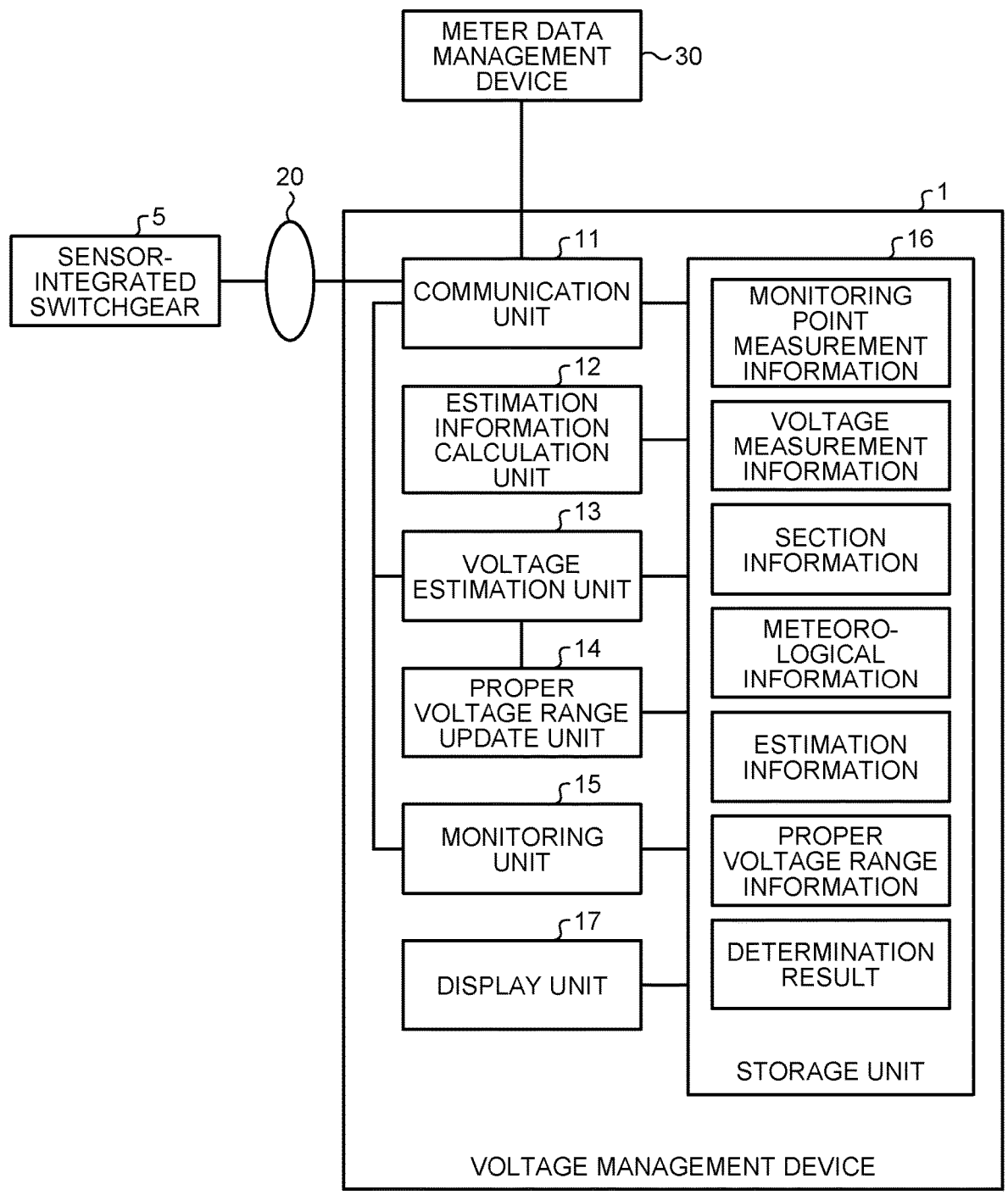
FIG. 3 is a diagram illustrating an example configuration of the voltage management device of the first embodiment.

FIG. 3 is a diagram illustrating an example configuration of the voltage management device 1 of the present embodiment. As illustrated in FIG. 3, the voltage management device 1 includes a communication unit 11, an estimation information calculation unit 12, a voltage estimation unit 13, a proper voltage range update unit 14, a monitoring unit 15, a storage unit 16, and a display unit 17. The voltage management device 1 of the present embodiment, the smart meters 7, and the sensor-integrated switchgears 5 together form a power system monitoring system.

The communication unit 11 communicates with the meter data management device 30, and communicates with the sensor-integrated switchgears 5 via the first network 20. When the communication unit 11 receives measurement information representing the voltage measured by each of the smart meters 7 from the meter data management device 30, the communication unit 11 stores the measurement information in the storage unit 15 as voltage measurement information. That is, the communication unit 11 is an acquisition unit that obtains, for each of sections in a power system, a measurement value of a voltage measured by a voltage measurement device connected to a corresponding one of the sections, where the sections are generated by segmentation between monitoring points. The communication unit 11 is also an acquisition unit that obtains measurement information obtained by measurement performed by the sensor-integrated switchgears 5. The measurement information from a smart meter 7 does not need to be obtained in real time, but may be obtained, for example, once a day or once a week. The voltage management device 1 does not need to obtain measurement information from the smart meters 7 of all the consumers connected to a distribution line 3 at one time, but may, for example, group the consumers into multiple groups, and obtain measurement information of the applicable smart meters 7 on different dates depending on the group. In addition, the voltage management device 1 does not need to obtain measurement information of the smart meters 7 for all the dates, but may obtain measurement information of the smart meters 7 for some of the dates.

Moreover, when the communication unit 11 receives measurement information representing measurement values of active power, of reactive power, and of a voltage from one of the sensor-integrated switchgears 5 via the first network 20, the communication unit 11 outputs the measurement information to the monitoring unit 15, and stores the measurement information in the storage unit 156 as monitoring point measurement information. The measurement information also includes information representing the time and date associated with each measurement value. The measurement information from each of the sensor-integrated switchgears 5 is periodically transmitted to the voltage management device 1. The measurement information from each of the sensor-integrated switchgears 5 is transmitted with a period of, for example, but not limited to, one minute. It is also assumed here that the sensor-integrated switchgears 5 each transmit one-minute average value of measurement results measured with a measurement period shorter than the transmission period, to the voltage management device 1. The measurement result is not limited thereto, but may be an instantaneous value of an RMS value or an average value of one minute or the like of the RMS value. Note that when each of the sensor-integrated switchgears 5 transmits an instantaneous value rather than an average value, the voltage management device 1 includes, for example, a data processing unit that calculates a one-minute average value of measurement results received, and the data processing unit outputs the average value to the monitoring unit 15, and stores the average value in the storage unit 16 as the monitoring point measurement information. Note that the average value of measurement results may also be a 30-second average value, a two-minute average value, or the like, and is not limited to a one-minute average value.

The communication unit 11 also receives meteorological information from a meteorological information delivery system (not illustrated) or the like, and stores the meteorological information in the storage unit 16. The meteorological information is information representing actual values and forecast values of weather, air temperature, and/or the like. The meteorological information may include an actual value and a forecast value of insolation intensity.

The estimation information calculation unit 12 determines estimation information for each time range using measurement information from applicable smart meters 7 stored in the storage unit 16, and stores the estimation information determined, in the storage unit 16. The estimation information is, as described above, information for use in estimation of the maximum voltage drop quantity and of the maximum voltage rise quantity. For example, the estimation information calculation unit 12 calculates, as the estimation information, information representing estimation equations for calculating the maximum voltage drop quantity and the maximum voltage rise quantity of each section based on a measurement result from the sensor-integrated switchgear 5 corresponding to each section using the measurement information from applicable smart meters 7 stored in the storage unit 16 and using the monitoring point measurement information stored in the storage unit 16. The estimation information will be described later in more detail.

The voltage estimation unit 13 estimates the voltage drop quantity and the voltage rise quantity in each section using the measurement information from applicable smart meters 7. Specifically, the voltage estimation unit 13 estimates the maximum voltage drop quantity and the maximum voltage rise quantity in each section using the estimation information calculated based on the measurement information from applicable smart meters 7 and stored in the storage unit 16, and provides estimation results to the proper voltage range update unit 14. For example, when the estimation information is information representing estimation equations for calculating the maximum voltage drop quantity and the maximum voltage rise quantity of each section based on the measurement result from the sensor-integrated switchgear 5 corresponding to each section, the voltage estimation unit 13 estimates the maximum voltage drop quantity and the maximum voltage rise quantity in each section using the estimation information and using the measurement information from the corresponding sensor-integrated switchgear 5 received from the communication unit 11.

The proper voltage range update unit 14 updates, for each section, the proper voltage range using the maximum voltage drop quantity and the maximum voltage rise quantity received from the voltage estimation unit 13, and stores the updated proper voltage range in the storage unit 16 as proper voltage range information. The monitoring unit 15 determines whether the voltage is outside the proper voltage range for each monitoring point, i.e., for each sensor-integrated switchgear 5, using information representing the voltage included in the measurement information received from the communication unit 11, and using the proper voltage range information stored in the storage unit 16. The monitoring unit 15 then stores the determination result in the storage unit 16.

The storage unit 16 stores the monitoring point measurement information, the voltage measurement information, section information, the meteorological information, the estimation information, the proper voltage range information, and the determination result. The section information includes information representing, for each section, the upstream-side sensor-integrated switchgear 5 installed at the start position of that section and the termination-side sensor-integrated switchgear 5 installed at the end position of that section, and also includes information representing the smart meters 7 connected to each section. The section information may also include information representing the geographical location of each section to allow association with the meteorological information. The section information may be input by an operator or may be transmitted from another device not illustrate.

The display unit 17 displays various types of information stored in the storage unit 16. For example, the display unit 17 displays the proper voltage range of each section, the determination result from the monitoring unit 15, and the like. Note that an example is herein described in which the voltage management device 1 includes the display unit 17, but the voltage management device 1 does note need to include the display unit 17. In this case, the determination result may be transmitted to another device to be displayed on another display device.

Figure 4:
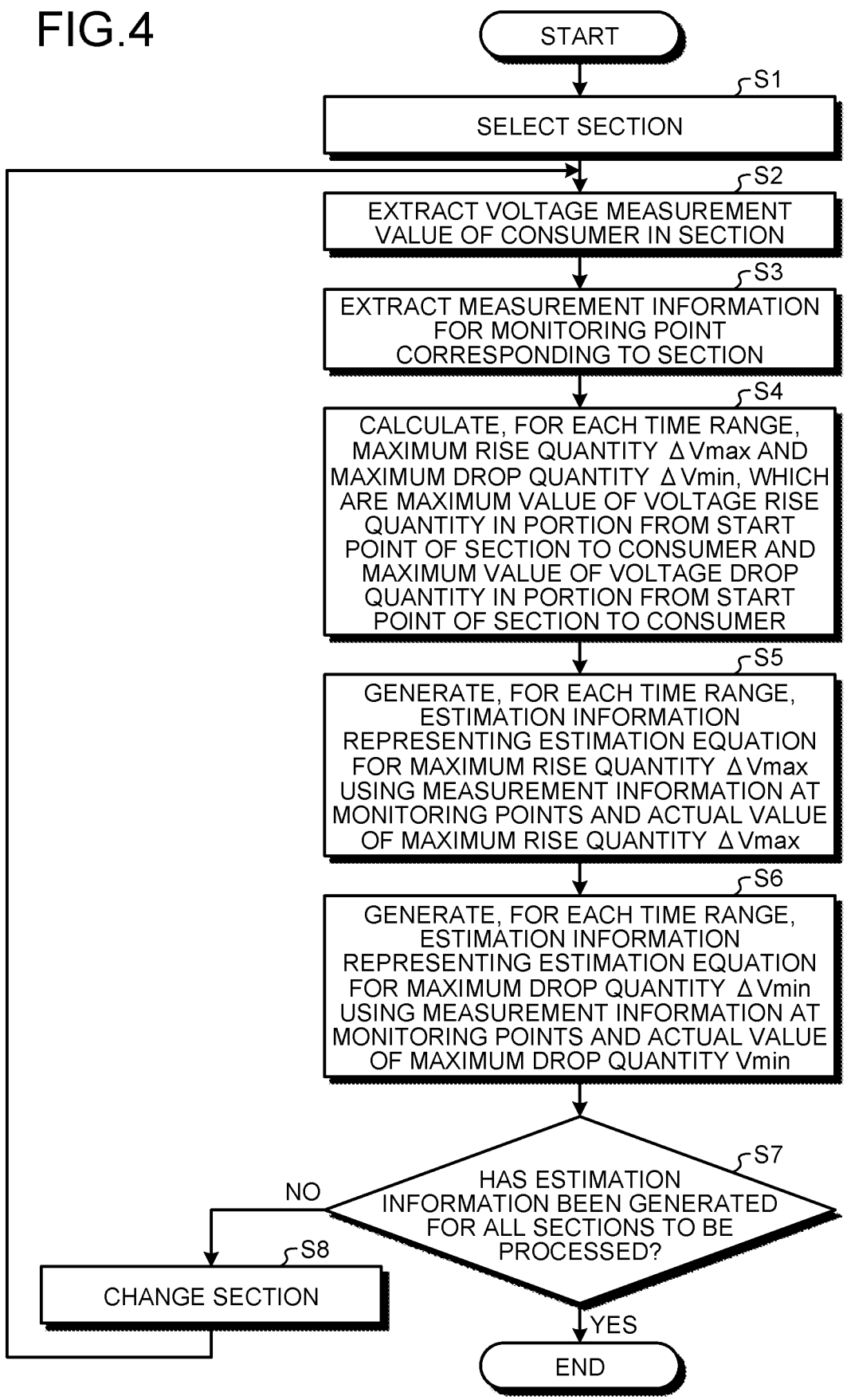
FIG. 4 is a flowchart illustrating an example of procedure for generating estimation information performed in the voltage management device of the first embodiment.

An operation of the present embodiment will next be described. FIG. 4 is a flowchart illustrating an example of procedure for generating the estimation information performed in the voltage management device 1 of the present embodiment. The process for generating the estimation information can be performed at any time as long as the storage unit 16 has stored therein voltage measurement information representing the voltage measured by each of the smart meters 7 and monitoring point measurement information obtained by measurement performed by the sensor-integrated switchgears 5. FIG. 4 assumes that the estimation information will be generated at the first time when no estimation information has yet been generated for any of the sections, and description is given below of an example of generating estimation information for all the sections to be monitored in the voltage management device 1. However, after the estimation information has once been generated for each section, the estimation information may be generated on a per-section basis, such as performing the operation only on a section for which voltage measurement information has been newly obtained. As described above, the voltage management device 1 does not need to obtain the voltage measurement information for all the consumers at one time. Accordingly, a section for which the estimation information is calculated may be determined for each day of the week in such a manner that, for example, voltage measurement information on Monday of the consumers associated with section #1 is obtained on Mondays to generate estimation information associated with section #1, or voltage measurement information on Tuesday of the consumers associated with section #1 is obtained on Tuesdays to generate estimation information associated with section #1. Note that the estimation information may be generated without distinction between weekdays and holidays or may be generated with a distinction between weekdays and holidays.

As illustrated in FIG. 4, the voltage management device 1 selects a section (step S1). Specifically, the estimation information calculation unit 12 selects a section for which the estimation information is to he generated, from the sections for which no estimation information has yet been generated, among the sections to be processed.

Next, the voltage management device 1 extracts voltage measurement values for the consumers present in that section (step S2). Specifically, the estimation information calculation unit 12 extracts the measurement value of the voltage measured by each of the smart meters 7 connected to the section selected at step S1, from the voltage measurement information stored in the storage unit 16, using the section information stored in the storage unit 16. The section information includes, for example, information representing the upstream-side sensor-integrated switchgear 5 among the sensor-integrated switchgears 5 segmenting each section, and identification information of the smart meter 7 of each of the consumers associated with that section. The voltage measurement information includes the identification information of the smart meters 7, thereby enabling the estimation information calculation unit 12 to extract the measurement value of the voltage measured by each of the smart meters 7 associated with the section selected at step S1, using the identification information of these smart meters 7. In addition, the voltage measurement information may include identification information of the consumers rather than identification information of the smart meters 7, in which case the section information includes the identification information of the consumers associated with each section.

Next, the voltage management device 1 extracts the measurement information at the monitoring point corresponding to that section (step S3). Specifically, the estimation information calculation unit 12 extracts the measurement information obtained by measurement performed by the sensor-integrated switchgear 5 corresponding to the section selected at step S1, from the monitoring point measurement information stored in the storage unit 16, using the section information stored in the storage unit 16.

Next, the voltage management device 1 calculates, for each time range, a maximum rise quantity ΔVmax and a maximum drop quantity ΔVmin, where the maximum rise quantity is the maximum value of the voltage rise quantity observed in a portion from the start point of that section to a consumer, and the maximum drop quantity is the maximum value of the voltage drop quantity observed in the portion from the start point of that section to the consumer (step S4). Specifically, the estimation information calculation unit 12 extracts, for each time range in a 24-hour format, a first voltage value from the voltage measurement values extracted at step S2, where the first voltage value is the voltage value corresponding to that time range, and a second voltage value, which is a voltage value at the time and date associated with the first voltage value among the measurement information extracted at step S3. Note that the measurement time and date of the voltage of a smart meter 7 and the measurement time and date in the measurement result of the corresponding sensor-integrated switchgear 5 are not necessarily the same as each other, and thus, the second voltage value may be, for example, a voltage value measured at time and date closest to the time and date of the first voltage value. Alternatively, the second voltage value may be an average value of values included in the measurement information from the sensor-integrated switchgear 5 in the time range corresponding to the time and date of the first voltage measurement value. For example, a five-minute average value of voltage measurement values of a smart meter 7 can be used as the first voltage value, and a five-minute average value of measurement results of the corresponding sensor-integrated switchgear 5 at the time and date associated with the first voltage value can be used as the second voltage value. The period for average value calculation is not limited to five minutes. The estimation information calculation unit 12 subtracts a voltage value obtained by conversion of the second voltage value into a low voltage, from the first voltage value to calculate the voltage drop quantity or the voltage rise quantity relative to the upstream monitoring point of each section for each time range. The voltage drop quantity and the voltage rise quantity may also be each hereinafter referred to as voltage change quantity. Note that regarding the voltage measurement value of a smart meter 7 of a high-voltage consumer, the estimation information calculation unit 12 subtracts the second voltage value from the first voltage measurement value, and converts the result of the subtraction into a low voltage to calculate the voltage drop quantity or the voltage rise quantity relative to the upstream monitoring point of each section for each time range.

As described above, the estimation information calculation unit 12 calculates amounts of change in voltage from the monitoring point of a section using multiple measurement values obtained before the time of monitoring, calculates a maximum rise quantity, and calculates a maximum drop quantity, where the maximum rise quantity is the maximum value of the amounts of change associated with a voltage rise, and the maximum drop quantity is the maximum value of the amounts of change associated with a voltage drop. The estimation information calculation unit 12 also calculates estimation information for calculating the maximum rise quantity based on the voltage measured by the corresponding sensor-integrated switchgear 5, using the maximum rise quantity and using the result of measurement of the voltage measured by the sensor-integrated switchgear 5 at the time and date corresponding to that maximum rise quantity, and calculates estimation information for calculating the maximum drop quantity based on the voltage measured by the corresponding sensor-integrated switchgear 5, using the maximum drop quantity and using the result of measurement of the voltage measured by the sensor-integrated switchgear 5 at the time and date corresponding to that maximum drop quantity.

Figure 5:
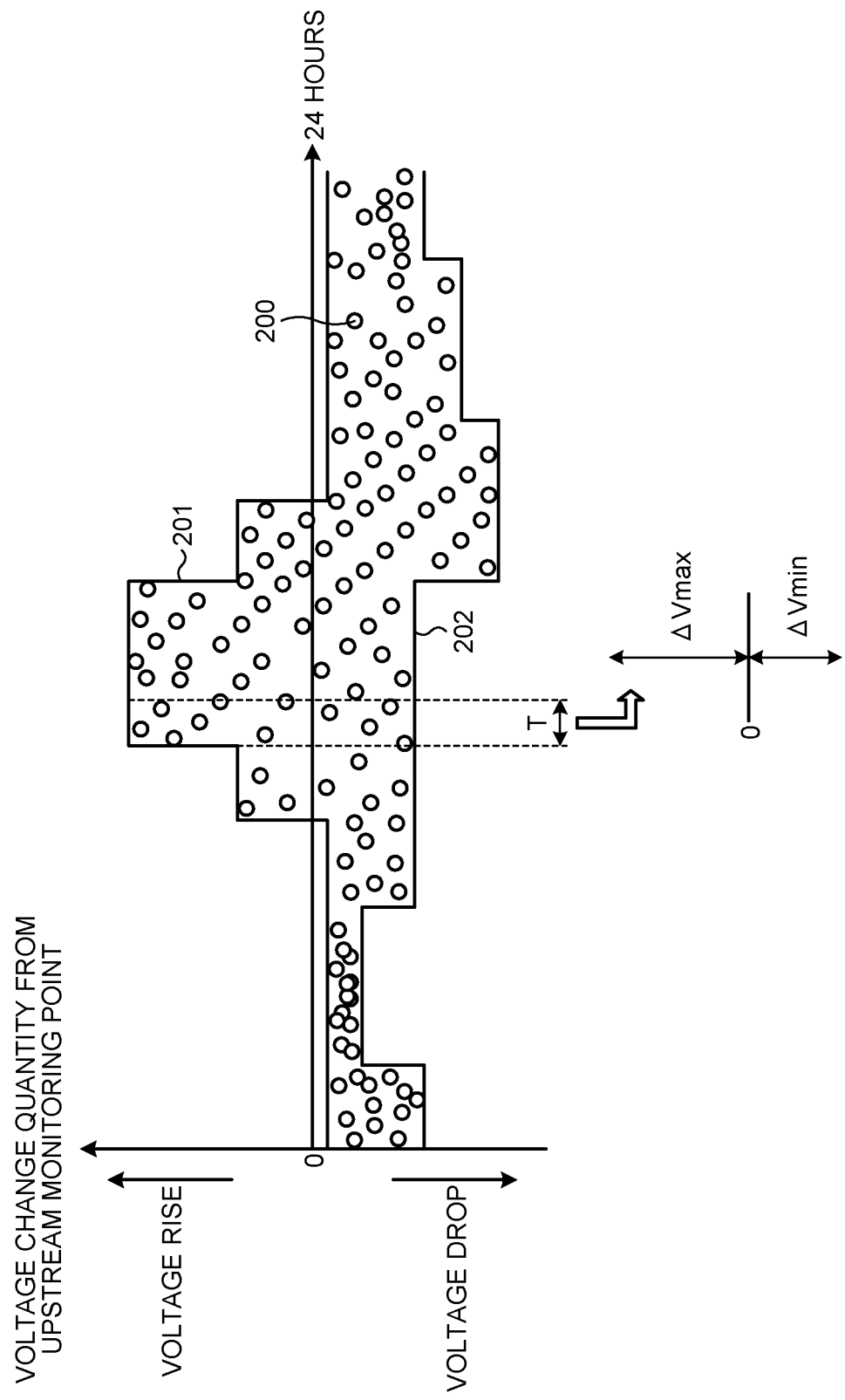
FIG. 5 is a diagram schematically illustrating an example of voltage change quantity calculated by an estimation information calculation unit of the first embodiment.

FIG. 5 is a diagram schematically illustrating an example of voltage change quantity calculated by the estimation information calculation unit 12 of the present embodiment. In FIG. 5, the horizontal axis represents time, and the vertical axis represents the voltage change quantity from the voltage at the upstream monitoring point, where a positive voltage change quantity indicates occurrence of a voltage rise, and a negative voltage change quantity indicates occurrence of a voltage drop. Although FIG. 5 illustrates one circle being indicated with a reference number, each point represented by a circle in FIG. 5 is a voltage change quantity 200 corresponding to each of the smart meters 7, including those indicated with no reference number. FIG. 5 illustrates the voltage change quantities 200 corresponding to one section, and thus plots, for example, N×(24×60/k) voltage change quantities 200, where N represents the number of smart meters 7 connected to that section, and k represents the transmission period in minutes of voltage of each smart meter 7. Note that FIG. 5 is a diagram schematically illustrating a conceptual picture, meaning that the number of the voltage change quantities 200 is not the actual number.

In addition, an envelope 201 of FIG. 5 represents the envelope of the voltage change quantities 200 on the voltage rise side, and an envelope 202 of FIG. 5 represents the envelope of the voltage change quantities 200 on the voltage drop side. The envelope 201 in each time range having a length of T represents the maximum rise quantity ΔVmax, and the envelope 202 in each time range having a length of T represents the maximum drop quantity ΔVmin, where T represents the length of each time range for calculating the estimation information. In a case of T having a value of, for example, 30 minutes, a total of 48 sets of the maximum rise quantity ΔVmax and the maximum drop quantity ΔVmin for each time range will be calculated at step S4. Note that the value of T is not limited to 30 minutes, but may be one hour or 20 minutes. In addition, the value of T can be the sane as the transmission period of the measurement result of each of the smart meters 7, but may be longer than the transmission period of the measurement result of each of the smart meters 7.

Next, returning to the description with reference to FIG. 4, the voltage management device 1 generates, for each time range, estimation information representing an estimation equation for the maximum rise quantity ΔVmax, using the measurement information at the monitoring points and the actual value of the maximum rise quantity ΔVmax (step S5).

Specifically, the estimation information calculation unit 12 generates, for each time range, information representing an estimation equation for estimating the maximum rise quantity ΔVmax, using the maximum rise quantity ΔVmax calculated at step S4 and the measurement information from the upstream-side and termination-side sensor-integrated switchgears 5 at the time and date corresponding to that maximum rise quantity ΔVmax. For example, when the maximum rise quantity ΔVmax is expressed by a linear expression of a difference between the voltage measured by the sensor-integrated switchgear 5 on the upstream side, i.e., at the upstream end, of a section and the voltage measured by the sensor-integrated switchgear 5 on the termination side, i.e., at the downstream end, of the section, a statistical technique such as regression analysis is used to calculate the coefficient of the linear expression.

For example, when section #1 illustrated in FIG. 2 is the section for use in estimation, the estimation information calculation unit 12 calculates the values of coefficients "a" and "F" of Equation (1) below using regression analysis or the like, where Equation (1) expresses the maximum rise quantity ΔVmax using V1 and V2, V1 is the measurement value of the voltage of the sensor-integrated switchgear 5-1, and V2 is the measurement value of the voltage of the sensor-integrated switchgear 5-2.

$$\Delta V\text{max} = a \cdot (V2 - V1) + F \quad (1)$$

The term (V2–V1) in Equation (1) above represents the voltage rise (or voltage drop in a case of a negative value) in the entire section from the sensor-integrated switchgear 5-1 to the sensor-integrated switchgear 5-2. The maximum rise quantity ΔVmax, which is the maximum value of the voltage rise quantity in portions from the sensor-integrated switchgear 5-1 to the interconnection points of consumers present in that section, is likely to be highly correlated with the value of (V2–V1). It is accordingly assumed here that ΔVmax can be expressed by a linear expression of (V2–V1) as expressed by Equation (1) above. Thus, the coefficients in the estimation equation can be used as the estimation information, where the estimation equation is for estimating the maximum rise quantity using the voltage measured by the sensor-integrated switchgear 5 disposed at the monitoring point on the termination side of a section, that is, at the downstream end of a section, and using the voltage measured by the sensor-integrated switchgear 5 disposed at the monitoring point at the upstream end of the section.

Alternatively, the estimation information calculation unit 12 may use not only the voltage but also measurement values of active power and reactive power at the sensor-integrated switchgears 5-1 and 5-2 to determine the values of a, b, c, d, e, and F using multiple regression analysis or the like when the maximum rise quantity ΔVmax is expressed by Equation (2) below.

$$\Delta V\text{max} = a \cdot (V2 - V1) + b \cdot P1 + c \cdot Q1 + d \cdot P2 + e \cdot Q2 + F \quad (2)$$

The maximum rise quantity ΔVmax is thought to be dependent not only on voltage but also on active power and reactive power at the sensor-integrated switchgears 5-1 and 5-2 disposed at both ends of the section. Accordingly, by also taking into consideration active power and reactive power as in Equation (2) above, accuracy of estimation of the maximum rise quantity ΔVmax can be improved.

In addition, there may be no sensor-integrated switchgear 5 on the termination side of a section. In this case, the estimation information calculation unit 12 uses, for example, active power P and reactive power Q at the sensor-integrated switchgear 5 on the upstream side of the section to determine the values of b, c, and F using multiple regression analysis or the like when the maximum rise quantity ΔVmax is expressed by Equation (3) blow.

$$\Delta V\text{max} = b \cdot P + c \cdot Q + F \quad (3)$$

Next, the voltage management device 1 generates, for each time range, estimation information representing an estimation equation for the maximum drop quantity ΔVmin, using the measurement information at the monitoring points and the actual value of the maximum drop quantity ΔVmin (step S6). Specifically, the estimation information calculation unit 12 generates, for each time range, information representing an estimation equation for estimating the maximum drop quantity ΔVmin, using the maximum drop quantity ΔVmin calculated at step S4 and the measurement information from the upstream-aide and termination-side sensor-integrated switchgears 5 at the time and date corresponding to that maximum drop quantity ΔVmin. Similarly to the operation for the maximum rise quantity ΔVmax, the estimation equation may be calculated using measurement values of voltage at the upstream-side and termination-side sensor-integrated switchgears 5, or using voltage, active power, and reactive power at the upstream-side and termination-side sensor-integrated switchgears 5.

For example, when section #1 illustrated in FIG. 2 is the section for use in estimation, the estimation information calculation unit 12 calculates the values of coefficients "g" and "L" of Equation (4) below expressing the maximum drop quantity ΔVmin, using regression analysis or the like. As described above, the coefficients in the estimation equation can be used as the estimation information, where the estimation equation is for estimating the maximum drop quantity using the voltage measured by the sensor-integrated switchgear 5 disposed at the monitoring point on the termination side of a section, that is, at the downstream end of a section, and using the voltage measured by the sensor-integrated switchgear 5 disposed at the monitoring point at the upstream end of the section.

$$\Delta V\text{min} = (g \cdot (V2 - V1) + L) \times (-1) \quad (4)$$

Alternatively, values of g, h, i, j, k, and L may be determined using multiple regression analysis or the like when the maximum drop quantity ΔVmin is expressed by Equation (5) below.

$$\Delta V\text{min} = (g \cdot (V2 - V1) + h \cdot P1 + i \cdot Q1 + j \cdot P2 + k \cdot Q2 + L) \times (-1) \quad (5)$$

In addition, when there is no sensor-integrated switchgear 5 on the termination aide of a section, the estimation information calculation unit 12 uses, for example, the active power P and the reactive power Q at the sensor-integrated switchgear 5 on the upstream side of the section to determine the values of h, i, and L using multiple regression analysis or the like when the maximum drop quantity ΔVmin is expressed by Equation (6) below.

$$\Delta V\text{min} = (h \cdot P + i \cdot Q + L) \quad (6)$$

The estimation information calculation unit 12 stores the estimation information calculated at step S5 and S5 in the storage unit 16. FIG. 6 is a diagram illustrating an example of the estimation information of the present embodiment. FIG. 6 illustrates the estimation information corresponding to one section. FIG. 6 illustrates an example of calculation of a, F, g, and L, which are the coefficients of the estimation equations of Equations (1) and (4) above. In the example illustrated in FIG. 6, the time range has a length of 30 minutes, and a total of 48 sets of the coefficients are thus calculated for one section every 30 minutes, and are stored in the storage unit 16 as the estimation information. The estimation information is generated on a per-section basis, and these 48 sets of the coefficients are thus stored in the storage unit 16 as the estimation information as many as the number of sections.

Note that the foregoing example has been given on the assumption that the estimation information is information representing estimation equations for estimating the maximum rise quantity $\Delta Vmax$ and the maximum drop quantity $\Delta Vmin$ using the measurement information from the sensor-integrated switchgears 5 for each time range. However, the estimation information is not limited thereto, and may be the maximum rise quantity $\Delta Vmax$ and the maximum drop quantity $\Delta Vmin$ themselves for each time range. The operation in this case is equivalent to calculating only the coefficient F of Equation (1) above and the coefficient L of Equation (4) above, and previous actual values of the maximum rise quantity $\Delta Vmax$ and of the maximum drop quantity $\Delta Vmin$ themselves are used as estimated values of the maximum rise quantity $\Delta Vmax$ and of the maximum drop quantity $\Delta Vmin$ for each section irrespective of the measurement information from the sensor-integrated switchgears 5.

The foregoing example has been described in which the voltage measurement values of the smart meters 7 for each time range are used without classification based on day of the week, meteorological information, and/or the like in calculation of the maximum rise quantity Lex and the maximum drop quantity $\Delta Vmin$. However, the estimation information calculation unit 12 may classify the voltage measurement values of the smart meters 7 based on day of the week, meteorological information, and/or the like, and calculate the estimation information for each of classified sets of the voltage measurement values. The operation may be performed in such a manner that, for example, the voltage measurement values of the smart meters 7 are grouped into a set of voltage measurement values of weekdays and a set of voltage measurement values of holidays, the maximum rise quantity $\Delta Vmax$ and the maximum drop quantity $\Delta Vmin$ are then calculated for each of the set of voltage measurement values of weekdays and the set of voltage measurement values of holidays, and information is calculated that represents estimation equations for the maximum rise quantity $\Delta Vmax$ and for the maximum drop quantity $\Delta Vmin$ using the maximum rise quantity $\Delta Vmax$ and the maximum drop quantity $\Delta Vmin$ that have been calculated. For example, when Equations (1) and (4) above are used as the estimation equations, the values of a, F, g, and L are calculated for each of the sets associated with weekdays and holidays.

Similarly, the estimation information calculation unit 12 way classify the voltage measurement values of the smart meters 7 based on weather conditions such as fine weather, cloudy weather, and rainy weather using the meteorological information stored in the storage unit 16 in calculation of the estimation information on a per-weather condition basis. In addition, a range of insolation intensity value may be defined in advance for each of multiple steps of insolation intensity, and the estimation information calculation unit 12 may classify the voltage measurement values of the smart meters 7 by the steps of insolation intensity to calculate the estimation information for each step of insolation intensity. In addition, a range of air temperature value may be defined in advance for each of multiple steps of air temperature, and the estimation information calculation unit 12 may classify the voltage measurement values of the smart meters 7 by the steps of air temperature to calculate the estimation information for each step of air temperature. Moreover, the estimation information calculation unit 12 may calculate the estimation information on a per-season basis. Furthermore, the estimation information calculation unit 12 may classify the voltage measurement values of the smart meters 7 based on multiple sets of information to calculate the estimation information for each group resulting from the classification, an example of which is to calculate the estimation information for each type of day (i.e., weekday and holiday) and each of weather conditions.

Alternatively, instead of calculating the estimation information for each step of air temperature, the estimation information calculation unit 12 may add a term expressed by a function of air temperature Temp to the estimation equations for estimating the maximum rise quantity $\Delta Vmax$ and the maximum drop quantity $\Delta Vmin$ to calculate the coefficient(s) in the function using regression analysis or the like. The function may be, for example, a linear function, a higher-order function, or a function other than these functions.

In addition, when the voltage measurement values of the smart meters 7 are collected for a long period of time, the estimation information calculation unit 12 may give priority to voltage measurement values having a more recent date for use in calculation of the estimation information.

Still alternatively, instead of determining the coefficients on the assumption of the above estimation equations, the estimation information calculation unit 12 may use machine learning to generate a learned model for estimating each of the maximum rise quantity $\Delta Vmax$ and the maximum drop quantity $\Delta Vmin$. Assume a case where, for example, similarly to Equation (1) above, the maximum rise quantity $\Delta Vmax$ is to be estimated using measurement values of voltage of the sensor-integrated switchgear 5 on the upstream side of a section and using measurement values of voltage of the sensor-integrated switchgear 5 on the termination side of the section. In this case, the estimation information calculation unit 12 generates, for each time range, a learned model for estimating the maximum rise quantity $\Delta Vmax$ by supervised learning using multiple sets of training data. Each set of the training data includes input data and labeled data, where the input data is measurement values of voltage of the sensor-integrated switchgear 5 on the upstream side of a section and measurement values of voltage of the sensor-integrated switchgear 5 on the termination side of the section, and the labeled data is the maximum rise quantity $\Delta Vmax$ calculated at step S4. The estimation information calculation unit 12 stores the learned model generated, in the storage unit 16 as the estimation information. Similarly, the estimation information calculation unit 12 generates, for each time range, a learned model for estimating the maximum drop quantity $\Delta Vmin$ by supervised learning using multiple sets of training data. Each set of the training data includes input data and labeled data, where the input data is measurement values of voltage of the sensor-integrated switchgear 5 on the upstream side of a section and measurement values of voltage of the sensor-integrated switchgear 5 on the termination side of the section, and the labeled data is the maximum drop quantity $\Delta Vmin$ calculated at step S4.

When active power, reactive power, and voltage of the sensor-integrated switchgears 5 on the upstream side and on the termination side of a section are to be used, use of these values as the input data also enables a learned model to be generated. In addition, when active power and reactive power at the sensor-integrated switchgear 5 on the upstream side of a section are to be used as expressed by Equations (3) and (6) above, use of these values as the input data similarly enables a learned model to be generated.

Neural network, for example, can be used as the algorithm for use in supervised learning, but the algorithm is not limited thereto, and any algorithm may be used. In addition, instead of generating a learned model for each time range, numbers may be assigned to the time ranges to generate training data having the input data also including the numbers of the respective time ranges. In this case, a learned model will be generated that estimates the maximum rise quantity $\Delta V_{max}$ based on the numbers identifying the time ranges, on measurement values of voltage of the sensor-integrated switchgear 5 on the upstream side of a section, and on measurement values of voltage of the sensor-integrated switchgear 5 on the termination side of the section. Also in cases of use of the distinction between weekday and holiday, the air temperature, and/or the weather, these factors may be included in the input data, and learning may be performed using such input data, instead of performing classification based on these factors and generating a learned model for each classification. When the distinction between weekday and holiday is used as the input data, the distinction is digitized such that, for example, a weekday is indicated by 0, and a holiday is indicated by 1 for use as the input data.

Returning to the description with reference to FIG. 4 after step S6, the estimation information calculation unit 12 of the voltage management device 1 determines whether the estimation information has been generated for all sections to be processed (step S7). When the estimation information has been generated for all sections to be processed (Yes at step S7), the estimation information calculation unit 12 terminates the process for generating the estimation information. When the estimation information has not yet been generated for all sections to be processed (No at step S7), the estimation information calculation unit 12 changes the section to another (step S8), and repeats the process from step S2.

The foregoing process causes the estimation information to be generated for each section. Note that the foregoing example has been described in which the smart meters 7 are used as the voltage measurement device for measuring a voltage of a low-voltage system, but when a power conditioning subsystem (PCS), which is a power conversion device that controls a sunlight power generation facility, a storage battery, and/or the like, is used to measure the voltage at the interconnection point, measurement results from the PCS may be used similarly to measurement results of smart meters 7. In addition, a voltage measurement device other than the smart meters 7 and the PCS may be installed in the low-voltage system to use a voltage measured by this voltage measurement device similarly to the measurement result of a smart meter 7. In this case, the voltage measurement device may be installed at each of a location where a large voltage drop quantity is anticipated relative to the monitoring point at the upstream end of the section, and a location where a large voltage rise is anticipated relative to the monitoring point at the upstream end of the section.

In addition, the foregoing example has been described in which measurement information from the smart meters 7 of all the consumers connected to each section is used, but measurement information from some of the smart meters 7 of all the consumers connected to each section may be used. In this case, it is desirable to use smart meters 7 respectively installed at a location where a large voltage drop quantity is anticipated and a location where a large voltage rise is anticipated.

Figure 7:
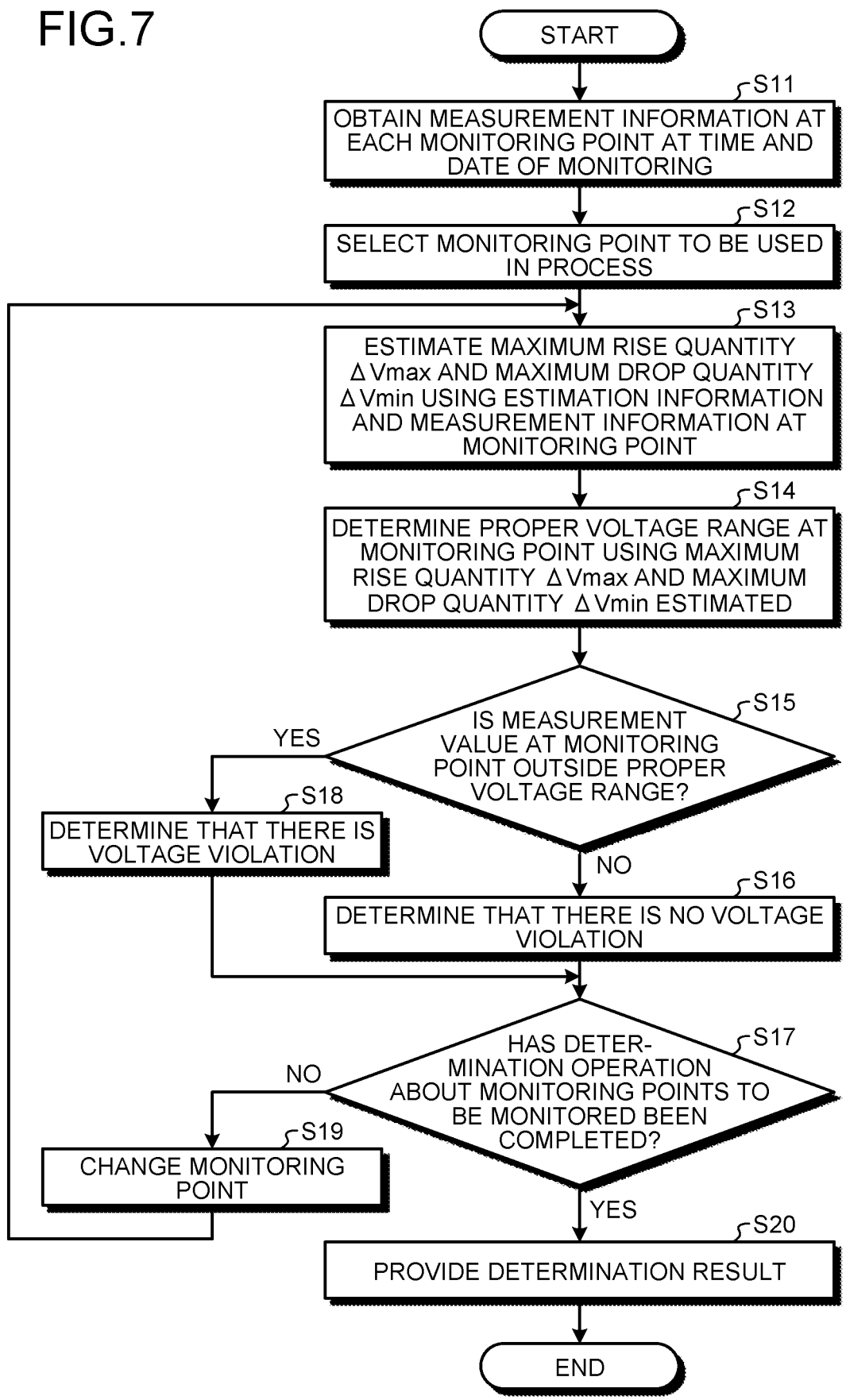
FIG. 7 is a flowchart illustrating an example of procedure of voltage monitoring process of the first embodiment.

A voltage monitoring process of the present embodiment will next be described. The voltage monitoring process of the present embodiment includes a process of estimating the voltage drop quantity and the voltage rise quantity in each section using the estimation information described above, i.e., a process of estimating the maximum rise quantity $\Delta V_{max}$ and the maximum drop quantity $\Delta V_{min}$ in each section. FIG. 7 is a flowchart illustrating an example of procedure of voltage monitoring process of the present embodiment.

The voltage management device 1 obtains measurement information at each monitoring point at a time and date of monitoring (step S11). Specifically, the voltage estimation unit 13 receives measurement information from each of the sensor-integrated switchgears 5 via the communication unit 11, and outputs the measurement information to the voltage estimation unit 13 and to the monitoring unit 15.

Next, the voltage management device 1 selects a monitoring point to be used in the process (step S12). Specifically, the voltage estimation unit 13 selects the sensor-integrated switchgear 5 to be used in the process, from the sensor-integrated switchgears 5 to be monitored to be used in monitoring processing. Next, the voltage management device 1 estimates the maximum rise quantity $\Delta V_{max}$ and the maximum drop quantity $\Delta V_{min}$ using the estimation information and the measurement information at the monitoring point (step S13). That is, the voltage estimation unit 13 calculates, for each section, the maximum rise quantity $\Delta V_{max}$ and the maximum drop quantity $\Delta V_{min}$ in that section, using the voltage measured by the sensor-integrated switchgear 5 at the time of monitoring and using the estimation information in the time range corresponding to the time of monitoring. The maximum rise quantity $\Delta V_{max}$ is the estimated value of the voltage rise quantity, and the maximum drop quantity $\Delta V_{min}$ is the estimated value of the voltage drop quantity. Specifically, the voltage estimation unit 13 estimates the maximum rise quantity $\Delta V_{max}$ and the maximum drop quantity $\Delta V_{min}$ in the section including the sensor-integrated switchgear 5 selected at step S12 being disposed at the upstream end, using the estimation information and the measurement information from the sensor-integrated switchgear 5 selected at step S12, stored in the storage unit 16.

For example, when the coefficients of the estimation equations expressed by Equations (2) and (5) above have been calculated as the estimation information, the voltage estimation unit 13 extracts, for each time range, the coefficients a, b, c, d, e, and F in the time range corresponding to the present tine, for the section including the sensor-integrated switchgear 5 selected at step S12 being disposed at the upstream end, from the estimation information. The voltage estimation unit 13 then estimates the maximum rise quantity $\Delta V_{max}$ according to Equation (2) using the coefficients a, b, c, d, e, and F extracted and the measurement information from the sensor-integrated switchgears 5 at the upstream end and at the termination end of that section. Similarly, the voltage estimation unit 13 extracts the coefficients h, i, j, k, and L in the time range corresponding to the present time, for the section including the sensor-integrated switchgear 5 selected at step S12 being disposed at the upstream end, from the estimation information. The voltage estimation unit 13 then estimates the maximum drop quantity ΔVmin according to Equation (5) using the coefficients g, h, i, j, k, and L extracted and the measurement information from the sensor-integrated switchgears 5 on the upstream side and on the termination side of that section. Note that the voltage estimation unit 13 determines that the estimated value of the maximum rise quantity ΔVmax is 0 when the maximum rise quantity ΔVmax estimated is a negative value, and similarly determines that the estimated value of the maximum drop quantity ΔVmin is 0 when the maximum drop quantity ΔVmin estimated is a negative value. Also when other estimation equations are used, the maximum rise quantity ΔVmax and the maximum drop quantity ΔVmin are similarly estimated, for each time range, according to the estimation equations using the measurement information from the corresponding sensor-integrated switchgear(s) 5 and using the coefficients stored as the estimation information.

Note that when the estimation information is a learned model, the voltage estimation unit 13 obtains, for each time range, a result of inference of each of the maximum rise quantity ΔVmax and the maximum drop quantity ΔVmin by inputting the measurement information from the upstream-side and termination-side sensor-integrated switchgears 5 (or the measurement information from the upstream-side sensor-integrated switchgear 5) into the learned model corresponding to each of the maximum rise quantity ΔVmax and the maximum drop quantity ΔVmin. When the estimation information is a set of the coefficients F and L, there is no need to use the measurement information from the sensor-integrated switchgear(s) 5, and the voltage estimation unit 13 thus uses, for each time range, the value of F extracted from the estimation information as the estimated value of the maximum rise quantity ΔVmax, and the value of L extracted from the estimation information as the estimated value of the maximum drop quantity ΔVmin. In addition, when the estimation information has been generated for each result of classification with respect to a factor such as weather or air temperature, the voltage estimation unit 13 extracts the weather, the air temperature, or the like corresponding to the time and date of monitoring from the meteorological information stored in the storage unit 16, and selects a corresponding piece of the estimation information from the estimation information stored in the storage unit 16 using the information extracted.

Next, the voltage management device 1 determines the proper voltage range at the monitoring point using the maximum rise quantity ΔVmax and the maximum drop quantity ΔVmin that have been estimated (step S14). Specifically, the voltage estimation unit 13 outputs the maximum rise quantity ΔVmax and the maximum drop quantity ΔVmin that have been estimated to the proper voltage range update unit 14, and the proper voltage range update unit 14 then updates, for each time range, the proper voltage range at the monitoring point according to Equations (7) and (8) below. Note that the voltage upper limit value is the upper limit value of the proper voltage range, and the voltage lower limit value is the lower limit value of the proper voltage range.

$$\text{Voltage upper limit value} = VH - \Delta V\text{max} \quad (7)$$

$$\text{Voltage lower limit value} = VL + \Delta V\text{min} \quad (8)$$

In these equations, VH and VL correspond to a predetermined tolerance range required of the voltage at a consumer end. For example, in the case of 100 V power reception, VH is 107 V, and VL is 95 V. As described above, the proper voltage range update unit 14 sets, for each section, the value obtained by subtracting the voltage rise quantity from the upper limit value of the predetermined tolerance range, as the upper limit value of the proper voltage range, and sets, for each section, the value obtained by adding the voltage drop quantity to the lower limit value of the proper voltage range, as the lower limit value of the proper voltage range. When all the consumers present in that section receive power at 100 V, the proper voltage range update unit 14 will determine, for each time range, a proper voltage range defined by the above voltage upper limit value and the above voltage lower limit value. Although the proper voltage range is herein given by a value obtained by conversion into a low voltage, the proper voltage range will be converted into a high voltage when a comparison is to be made with a voltage in a high-voltage system measured by a sensor-integrated switchgear 5.

Next, the voltage management device 1 determines whether the measurement value at the monitoring point falls outside the proper voltage range (step S15). Specifically, the monitoring unit 15 reads the proper voltage range of the time range of the present time with respect to the monitoring point selected at step S12, from the proper voltage range information stored in the storage unit 16. When the measurement value of voltage included in the measurement information from the sensor-integrated switchgear 5 corresponding to the monitoring point selected at step S12 falls below the voltage lower limit value, or exceeds the voltage upper limit value, of the proper voltage range read, the monitoring unit 15 determines that the measurement value at the monitoring point falls outside the proper voltage range.

When the measurement value at the monitoring point does not fall outside the proper voltage range (No at step S15), the monitoring unit 15 determines that there is no voltage violation (step S16). Specifically, the monitoring unit 15 determines that there is no voltage violation, and stores, as a determination result, information indicating that there is no voltage violation in association with information representing the monitoring point and with the time and date, in the storage unit 16. When the measurement value at the monitoring point falls outside the proper voltage range (Yes at step S15), the monitoring unit 15 determines that there is a voltage violation (step S18). Specifically, the monitoring unit 15 determines that there is a voltage violation, and stores, as a determination result, information indicating that there is a voltage violation in association with information representing the monitoring point and with the time and date, in the storage unit 16.

After step S16 and after step S18, the monitoring unit 15 determines whether the determination process with respect to the monitoring points to be monitored has been completed, that is, whether the process of determination of whether there is a voltage violation has been made for all the monitoring points to be monitored (step S17). When the determination process with respect to the monitoring points to be monitored has not been completed (No at step S17), the voltage management device 1 changes the monitoring point to another (step S19), and repeats the process from step S13. Specifically, when No at step S17, the monitoring unit 15 instructs the voltage estimation unit 13 to change the monitoring point, and the voltage estimation unit 13 then selects a monitoring point on which the determination process has not yet been performed, among the monitoring points to be monitored. Thus, the voltage management device 1 changes the monitoring point to another and repeats the process from step S13.

When the determination process with respect to the monitoring points to be monitored has been completed (Yes at step S17), the voltage management device 1 provides the determination result (step S20), and terminates the process. At step S20, for example, the display unit 17 may display the determination result stored in the storage unit 16, or the communication unit 11 transmits the determination result to another device, to provide the determination result to an operator or the like.

The monitoring process illustrated in FIG. 7 will next be described using section #1 illustrated in FIG. 2 as an example. FIG. 8 is a diagram illustrating a method for calculating a proper voltage range of the present embodiment. FIG. 8 illustrates an example in which monitoring point #1 is selected as the monitoring point, where monitoring point #1 is the installation location of the sensor-integrated switchgear 5 on the upstream side in section #1 illustrated in FIG. 2. The character t1 in the parentheses of P1($t$1) and the like represents time t1. FIG. 8 illustrates a method of calculation in the time range corresponding to time t1. A maximum rise quantity $\Delta$Vmax(t1) and a maximum drop quantity $\Delta$Vmin(t1) at time t1 are calculated using P1($t$1), Q1($t$1), and V1($t$1), which are measurement information from the sensor-integrated switchgear 5-1 at time t1, and using P2($t$1), Q2($t$1), and V2($t$1), which are measurement information from the sensor-integrated switchgear 5-2 at time t1. In addition, the voltage upper limit value is calculated using the maximum rise quantity $\Delta$Vmax(t1), and the voltage lower limit value is calculated using the maximum drop quantity $\Delta$Vmin(t1).

Using the voltage upper limit value and the voltage lower limit value calculated as described above, it is determined whether the voltage V1($t$1) at the installation location of the sensor-integrated switchgear 5-1 corresponding to monitoring point #1 falls within the proper voltage range. Note that the sensor-integrated switchgear 5-1 and the sensor-integrated switchgear 5-2 may transmit measurement information with a time gap, in which case measurement information received during a time period, for example, from time t1 to time (t1+$\Delta$t) can be used and processed as measurement information received at time t1.

Performing the process illustrated in FIG. 7 in every transmission period $\Delta$t of transmission of measurement information from the sensor-integrated switchgears 5 enables the measurement information received to he monitored. Note that instead of monitoring the voltage every transmission period, an average value of multiple voltage values corresponding to multiple respective transmission periods may be used to similarly perform the monitoring process illustrated in FIG. 7. In this case, the average value can also be used as the measurement information for use in estimation of the maximum rise quantity $\Delta$Vmax and of the maximum drop quantity $\Delta$Vmin.

In addition, although the example illustrated in FIG. 7 has been described in which the proper voltage range is updated each time a determination is made of whether the voltage has fallen outside the proper voltage range, the proper voltage range may be updated less frequently than the frequency of the determination of whether the voltage has fallen outside the proper voltage range. For example, once the proper voltage range of voltage is updated, the proper voltage range of voltage does not need updating in a time range in which the same estimation information will be used. For example, when the time range has a length of 30 minutes, and measurement information is received from each of the sensor-integrated switchgears 5 at 12:00, after which the process illustrated in FIG. 7 is performed, and then measurement information is received from each of the sensor-integrated switchgears 5 at 12:01, the operations at and after step S15 may be performed after step S12 without performance of the operations at steps S13 and S14 illustrated in FIG. 7. The process may be performed in such a manner that the operations at steps S13 and S14 are skipped as described above before 12:30, and the entire process illustrated in FIG. 7 is performed again at 12:30. Alternatively, the process may be performed in such a manner that the operations at steps S13 and S14 are performed every N (where N is an integer greater than or equal to 2) times of reception of measurement information, and the maximum rise quantity $\Delta$Vmax and the maximum drop quantity $\Delta$Vmin are estimated at step S13 using average values of N sets of the measurement information.

As described above, in present embodiment, estimation information for estimating the maximum rise quantity $\Delta$Vmax and the maximum drop quantity $\Delta$Vmin of voltage in each section is calculated for each time range using actual values. In the monitoring operation, the proper voltage range is updated using the estimation information of the corresponding time range and using the latest measurement information from the sensor-integrated switchgears 5. The voltage management device 1 of the present embodiment then monitors whether the voltage received from the corresponding sensor-integrated switchgear 5 falls within the proper voltage range. In the present embodiment, the maximum rise quantity $\Delta$Vmax and the maximum drop quantity $\Delta$Vmin are estimated based on actual values, thereby enabling the proper voltage range to be set to a range suitable for the actual condition of each section. This can prevent overestimation of the voltage drop quantity or the voltage rise quantity, and can thus prevent increase in facility cost.

The voltage of a power system is monitored for purpose of verifying whether the voltage at a consumer end is maintained at a proper voltage. However, it is difficult to recognize the voltage at a location as far as a consumer end through general monitoring operation performed in a power system. In this respect, the voltage management device 1 of the present embodiment collects a measurement value of voltage at a consumer end, thereby also enabling verification of whether the voltage at a consumer end is at a suitable level.

Figures 9, 10:
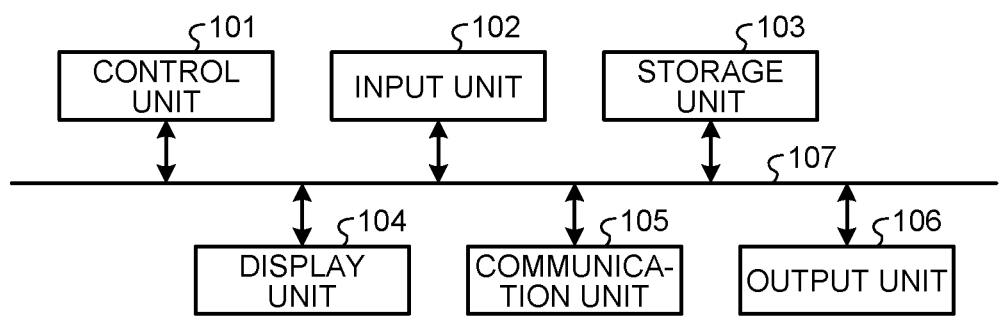
FIG. 9 is a diagram illustrating an example of display screen of the proper voltage range of the first embodiment.
FIG. 10 is a diagram illustrating an example configuration of a computer system for implementing the voltage management device of the first embodiment.

In addition, since the proper voltage range is updated over time in the present embodiment, the display unit 17 may display the proper voltage range currently set. FIG. 9 is a diagram illustrating an example of display screen of the proper voltage range of the present embodiment. As illustrated in FIG. 9, the display unit 17 may display the proper voltage range, for example, for each monitoring point, that is, for each of the sensor-integrated switchgears 5. Note that the illustration in FIG. 9 is merely by way of example, and the display format is not limited to the example illustrated in FIG. 9. In addition, the display unit 17 may also display information representing the locations of the monitoring points in the power system on the display screen illustrated in FIG. 9. For example, the display unit 17 may display a diagram such as one exemplified in FIG. 2 indicating the locations of the sensor-integrated switchgears 5 with the number of each monitoring point, together with information on the proper voltage range of each of the monitoring points illustrated in FIG. 9.

An example hardware configuration of the voltage management device 1 of the present embodiment will next be described. FIG. 10 is a diagram illustrating an example configuration of a computer system for implementing the voltage management device 1 of the present embodiment.

As illustrated in FIG. 10, this computer system includes a control unit 101, an input unit 102, a storage unit 103, a display unit 104, a communication unit 105, and an output unit 106, which are connected to one another via a system bus 107. In FIG. 10, the control unit 101 is, for example, a central processing unit (CPU) or the like. The control unit 101 executes a program describing operations to be performed in the voltage management device 1 of the present embodiment. The input unit 102 includes for example, a keyboard, a mouse, and/or the like, and is used by a user of the computer system to input various types of information. The storage unit 103 includes memories such as a random access memory (RAM) and a read-only memory (ROM), and a storage device such as a hard disk drive. The storage unit 103 stores a program to be executed by the foregoing control unit 101, necessary data obtained during a process, and the like. The storage unit 103 is also used as a temporary storage area for a program. The display unit 104 includes a liquid crystal display panel (LCD) and/or the like. The display unit 104 displays various types of screens for the user of the computer system. The communication unit 105 is a receiver and a transmitter for providing communication processing. The output unit 106 is a printer and/or the like.

Description is now given of an example operation of the computer system until a voltage management program for implementing the voltage management device 1 of the present embodiment becomes executable. In a computer system configured as described above, the voltage management program is installed in the storage unit 103 from, for example, a compact disc (CD)-ROM or a digital versatile disc (DVD)-ROM placed in a CD-ROM drive or a DVD-ROM drive (not illustrated). Then, when the voltage management program is to be executed, a program read from the storage unit 103 is loaded into the storage unit 103. In this state, the control unit 101 performs a process of the voltage management device 1 of the present embodiment according to the voltage management program loaded into the storage unit 103.

Note that a CD-ROM or a DVD-ROM has been described above as a recording medium for providing the voltage management program that describes the processes, but the medium is not limited thereto. A program may be used that has been provided, for example, using a transmission medium such as the Internet via the communication unit 105 depending on the configuration of the computer system, the size of the program to be provided, and/or the like.

The communication unit 11 illustrated in FIG. 3 is implemented by, for example, the communication unit 105 illustrated in FIG. 10. The estimation information calculation unit 12, the voltage estimation unit 13, the proper voltage range update unit 14, and the monitoring unit 15 illustrated in FIG. 3 are implemented by the control unit 101 by executing the voltage management program. The storage unit 103 is also used in providing the functionalities of these components. The storage unit 16 illustrated in FIG. 3 is implemented by the storage unit 103 illustrated in FIG. 10. The display unit 17 illustrated in FIG. 3 is implemented by the display unit 104 illustrated in FIG. 10. Note that the configuration of FIG. 10 is by way of example, and the configuration of the computer system is not limited to the example illustrated in FIG. 10. For example, the computer system does not necessarily need to include the output unit 106.

In addition, the voltage management device 1 of the present embodiment may be implemented in a single computer system or in multiple computer systems. For example, the voltage management device 1 may be implemented in a cloud system.

The voltage management program of the present embodiment causes, for example, a computer system to perform a step of obtaining, for each of sections in a power system, a measurement value of a voltage measured by a voltage measurement device connected to a corresponding one of the sections, the sections being generated by segmentation between monitoring points, and a step of estimating, for each of the sections, a voltage drop quantity and a voltage rise quantity in the corresponding one of the sections using the measurement value.

As described above, in the present embodiment, estimation information for estimating a maximum rise quantity $\Delta Vmax$ and a maximum drop quantity $\Delta Vmin$ is calculated for each time range using actual values of the maximum rise quantity $\Delta Vmax$ and the maximum drop quantity $\Delta Vmin$ of voltage in each section, and then the maximum rise quantity $\Delta Vmax$ and the maximum drop quantity $\Delta Vmin$ are estimated using the estimation information. In this manner, in the present embodiment, an estimation can be made of the voltage drop quantity and the voltage rise quantity in each of sections generated by segmentation between monitoring points. In addition, by using, as the estimation information, the information for use in estimation of the maximum rise quantity $\Delta Vmax$ and the maximum drop quantity $\Delta Vmin$ from measurement information from the sensor-integrated switchgear(s) 5, the maximum rise quantity $\Delta Vmax$ and the maximum drop quantity $\Delta Vmin$ can be precisely calculated depending on the condition of each section.

Moreover, in the present embodiment, use of no system impedance data in estimation of the voltage rise quantity and of the voltage drop quantity enables an estimation error to be reduced. In addition, use of no estimated value of amount of solar power generation, and of no estimated value of load distribution, in the voltage rise quantity and in the voltage drop quantity eliminates effect of an estimation error of these, thereby enabling the voltage rise quantity and the voltage drop quantity to be precisely estimated. Furthermore, use of no estimation result of reactive power distribution, i.e., no estimation result of usage of power factor improvement capacitors of a high-voltage consumer and no power factor estimation result specific to each consumer, in estimation of voltage rise and drop eliminates effect of an estimation error of these, thereby enabling the voltage rise quantity and the voltage drop quantity to be precisely estimated. In the present embodiment, the maximum rise quantity $\Delta Vmax$ and the maximum drop quantity $\Delta Vmin$ are precisely estimated, and a proper voltage range is set using estimation results thereof. This can prevent overestimation of the voltage drop quantity or the voltage rise quantity in setting of the proper voltage range, and can thus prevent increase in facility cost in view of occurrence of deviation from the proper voltage range. In addition, in the present embodiment, voltage rise and drop in a section including a monitoring point at the upstream end of the section are taken into consideration in the proper voltage range at that monitoring point. Thus, monitoring whether the voltage at a monitoring point falls within the proper voltage range enables monitoring to be performed of whether the voltages at the power receiving points of all the consumers connected to the section having that monitoring point at the upstream end of the section fall within a predetermined range such as from 95 V to 107 V.

Second Embodiment

Figure 11:
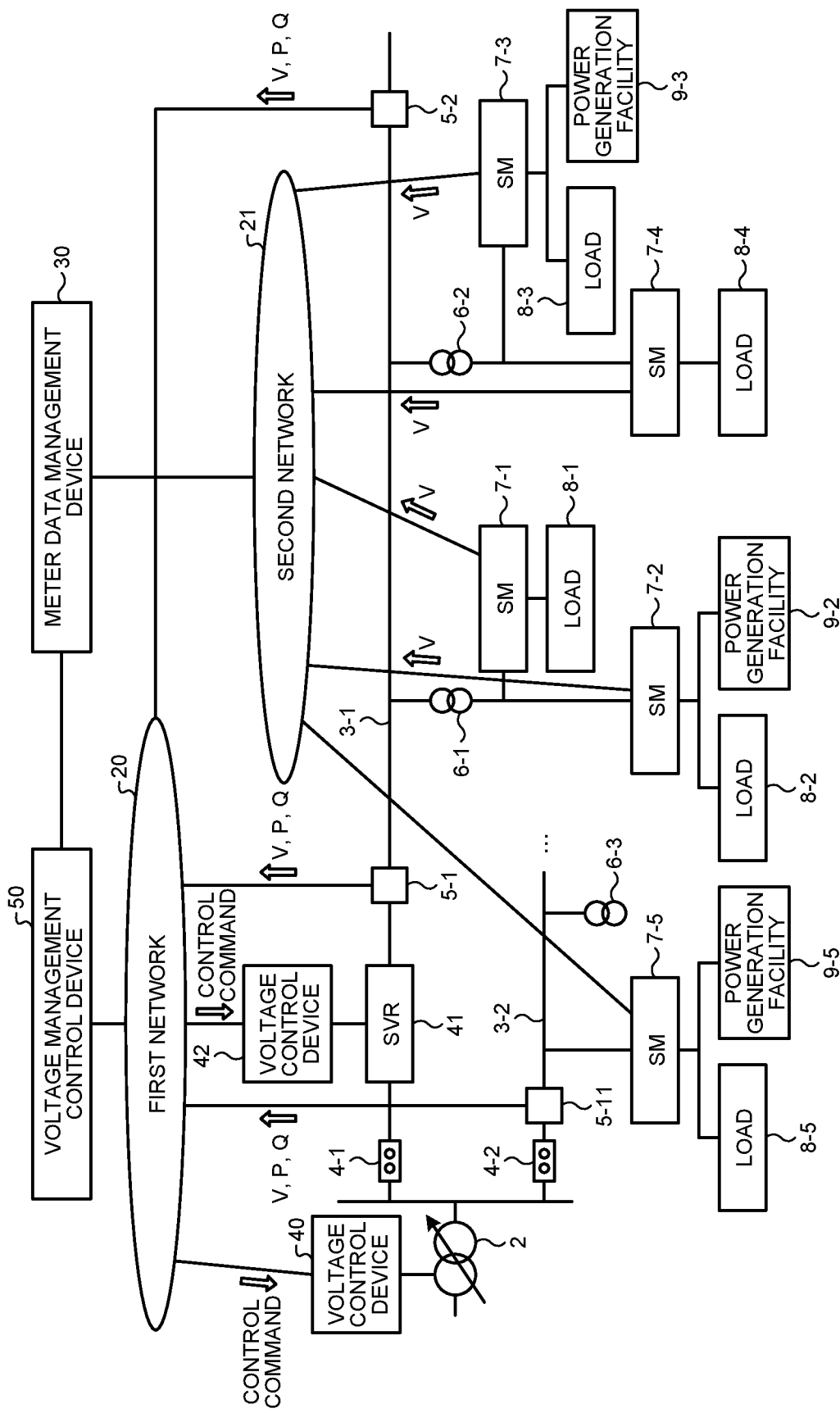
FIG. 11 is a diagram illustrating an example configuration of a voltage management control device according to a second embodiment and a power system to be monitored and controlled.

FIG. 11 is a diagram illustrating an example configuration of a voltage management control device according to a second embodiment and a power system to be monitored and controlled. The present embodiment will be described with respect to an example in which a voltage management control device 50, which is a voltage command device, monitors a power system similarly to the voltage management device 1 of the first embodiment, and controls the voltage of the power system using a centralized control method. That is, the voltage management control device 50 is a voltage management device having functionality to centrally control the voltage of the power system. Components having functionality similar to the functionality of the first embodiment are designated by reference characters identical to those used in the first embodiment, and duplicate description will be omitted. Differences from the first embodiment will be primarily described below.

In the present embodiment, the power distribution system, which is an example of power system to be monitored and controlled by the voltage management control device 50, further includes voltage control devices 40 and 42, which each receive a control command from the voltage management control device 50, in addition to the components included in the power distribution system of the first embodiment. The voltage control device 40 receives a control command from the voltage management control device 50 via the first network 20, and controls the tap position of the distribution transformer 2 based on the control command received. The voltage control device 42 receives a control command from the voltage management control device 50 via the first network 20, and controls a step voltage regulator (SVR) 41 based on the control command received, where the SVR 41 is a voltage controller that controls the voltage of the distribution line 3-1. Although not illustrated, another SVR 41 is connected to the distribution line 3-2, which SVR 41 is controlled similarly by a voltage control device 42 associated with that SVR 41 based on a control commend from the voltage management control device 50. In addition, multiple sets of the SVR 41 and the voltage control device 42 may be provided on each of the distribution lines 3. Note that FIG. 11 illustrates voltage controllers of a transformer type, but a voltage controller of a reactive power regulation type may he included as a voltage controller to be controlled. The term voltage controller hereinafter includes the distribution transformer 2, the SVRs 41, and a voltage controller of a reactive power regulation type.

Figure 12:
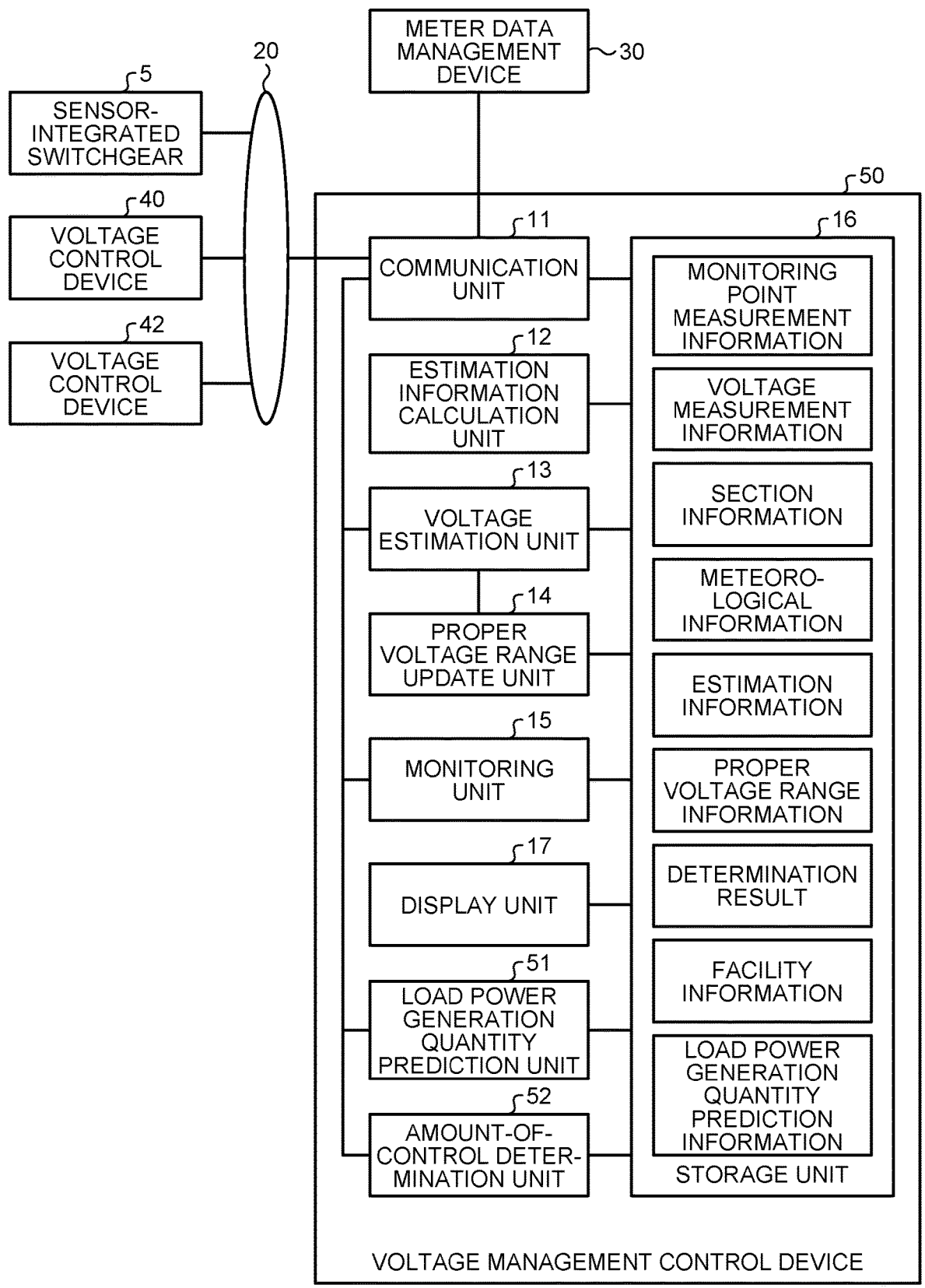
FIG. 12 is a diagram illustrating an example configuration of the voltage management control device of the second embodiment.

FIG. 12 is a diagram illustrating an example configuration of the voltage management control device 50 of the present embodiment. As illustrated in FIG. 12, the voltage management control device 50 of the present embodiment includes the communication unit 11, the estimation information calculation unit 12, the voltage estimation unit 13, the proper voltage range update unit 14, the monitoring unit 15, the storage unit 16, and the display unit 17, which are similar to the respective ones in the first embodiment, and further includes a load power generation quantity prediction unit 51 and an amount-of-control determination unit 52. In addition, in the present embodiment, the storage unit 16 stores information similar to the information of the first embodiment, and further stores facility information and load power generation quantity prediction information.

The load power generation quantity prediction unit 51 predicts a distribution of a load power generation quantity of the power distribution system for a future fixed time period, such as a next day, in a form of, for example, an hourly profile. The term load power generation quantity refers to an amount calculated by subtracting the power generation quantity from the net load. The load power generation quantity represents the amount of load when the load power generation quantity has a positive value, and the power generation quantity when the load power generation quantity has a negative value. The load power generation quantity prediction unit 51 determines the load power generation quantity at each point of the power distribution system by, for example, an operation such as calculation of a difference between average values of power flow at respective measurement points next to each other, based on monitoring point measurement information, i.e., measurement information from the sensor-integrated switchgears 5, previously received and stored in the storage unit 16. A load power generation quantity distribution is predicted by performing this operation on each point of the power distribution system. The load power generation quantity prediction unit 51 stores a result of this prediction of the load power generation quantity at each point of the power distribution system in the storage unit 16 as the load power generation quantity prediction information. The load power generation quantity prediction, information is updated as appropriate based on the measurement information from the sensor-integrated switchgears 5.

The load power generation quantity prediction unit 51 collects an actual amount of load during, for example, multiple days, and determines in advance a correlation between the amount of load and the air temperature of a same time range for each day of the week or for each type of day (i.e., weekday and holiday). Information on this correlation is stored in a form such as a relational expression determined using regression analysis or the like, or a table. Then, the load power generation quantity prediction unit 51 predicts the hourly amount of load at each point of the power distribution system for the next day, based on this correlation and a predicted air temperature of the next day. In addition, the power generation quantity of the next day is a theoretical power generation quantity based on a weather prediction of the next day. The load power generation quantity prediction unit 51 subtracts the predicted power generation quantity from the predicted amount of load to generate an hourly distribution profile of the load power generation quantity of the next day at each point of the power distribution system, and stores the hourly distribution profile in the storage unit 16 as the load power generation quantity prediction information.

Moreover, the load power generation quantity prediction unit 51 corrects, on the very day of monitoring and control, the load power generation quantity prediction information stored in the storage unit 16 based on a result of comparison between an actual value of the load power generation quantity distribution in the period of the centralized voltage control cycle immediately before and a predicted value in that cycle.

The amount-of-control determination unit 52 determines an amount of control to be applied by a corresponding one of the voltage controllers that control the voltages of the distribution lines 3, using the voltage measured by each of the sensor-integrated switchgears 5 and using the proper voltage range of each section, and issues a command about the amount of control determined, to the voltage control devices 40 and 42, which control the voltage controllers, via the communication unit 11. Specifically, the amount-of-control determination unit 52 calculates a power flow based on the load power generation quantity prediction information that has been corrected, i.e., the predicted value of the load power generation quantity distribution that has been corrected, and searches for a best solution that will provide a best value of an evaluation function for evaluating the voltage distribution of the power distribution system, using the measurement information from the corresponding one of the sensor-integrated switchgears 5 and the proper voltage range corresponding to that sensor-integrated switchgear 5. The amount-of-control determination unit 52 thus determines an optimum voltage distribution and an optimum amount of control to be applied by each voltage controller in the period of that centralized voltage control cycle. Note that the optimum voltage distribution is a voltage distribution at each point of the power distribution system that satisfies a limiting condition and causes the evaluation function to provide an optimal result. The term each point of the power distribution system includes the location where the corresponding sensor-integrated switchgear 5 makes measurement on the distribution line 3. The optimum amount of control is an amount of control commanded to the distribution transformer 2 and each SVR 41 to use for providing the optimum voltage distribution. The amount of control used by the distribution transformer 2 and each SVR 41 that are each a voltage controller of a transformer type is a tap position. The amount of control to be applied by a voltage controller of a reactive power regulation type is the amount of reactive power output by that voltage controller.

Figure 13:
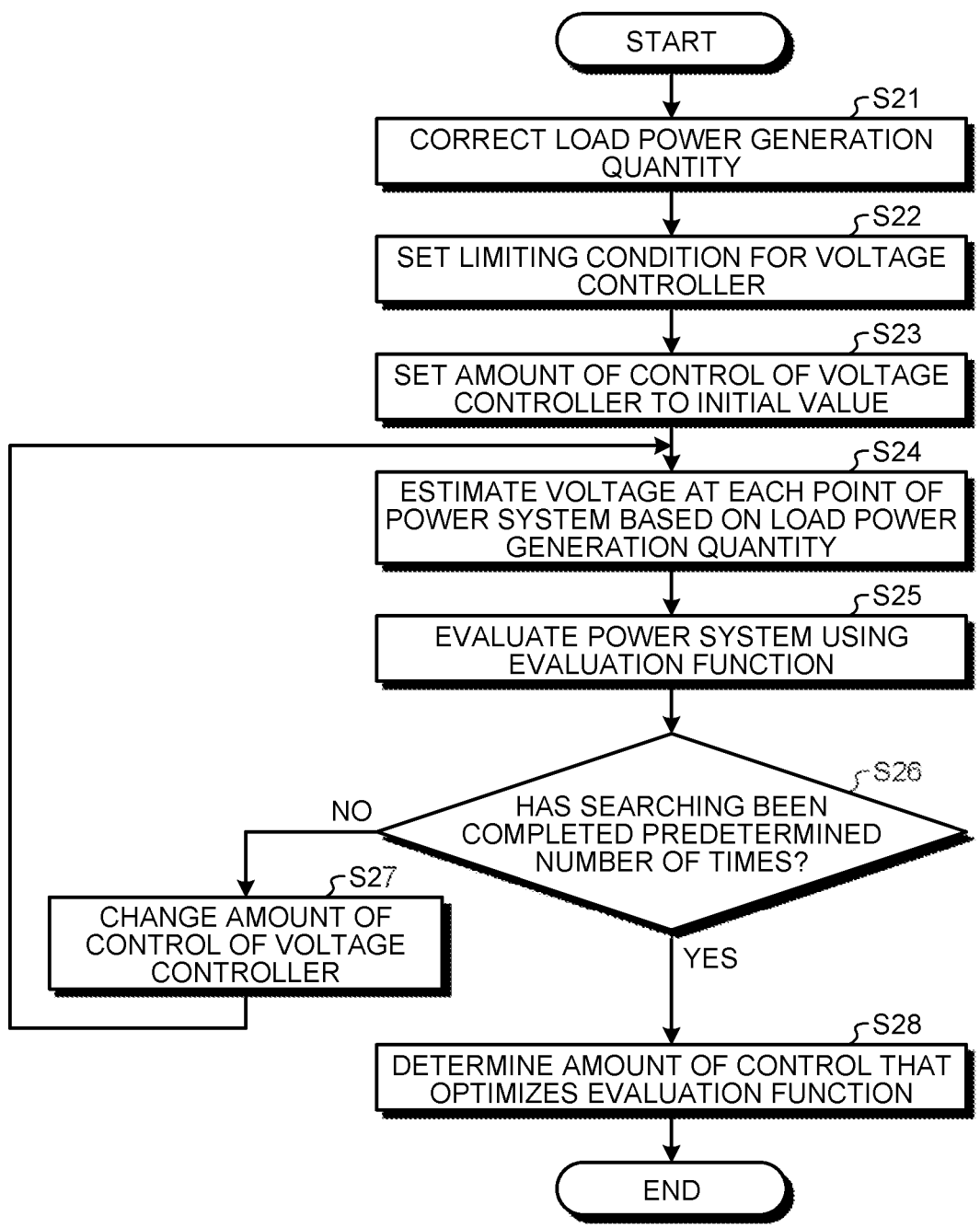
FIG. 13 is a flowchart illustrating an example of centralized voltage control procedure of the second embodiment.

FIG. 13 is a flowchart illustrating an example of centralized voltage control procedure of the present embodiment. The voltage management control device 50 performs the monitoring process described in the first embodiment, and also performs the process described below every centralized voltage control cycle. The centralized voltage control cycle is, for example, but not limited to, five minutes.

First, the voltage management control device 50 corrects the load power generation quantity (step S21). Specifically the load power generation quantity prediction unit 51 determines the ratio between a predicted value of the load power generation quantity, represented by the load power generation quantity prediction information described above stored in the storage unit 16, and an actual value calculated based on the monitoring point measurement information received from the corresponding one of the sensor-integrated switchgears 5 during the last fixed time period and stored in the storage unit 16. The load power generation quantity prediction unit 51 then multiplies the predicted value of the load power generation quantity for a future fixed time period by this ratio to correct the predicted value of the load power generation quantity at each point of the power system for the future fixed time period. The foregoing fixed time period is, for example, the centralized voltage control cycle.

Next, the amount-of-control determination unit 52 of the voltage management control device 50 sets a limiting condition for each voltage controller (step S22). The limiting condition is the controllable range of each voltage controller, or the like. The amount-of-control determination unit 52 sets the amount of control to be applied by each of the voltage controllers to an initial value (step S23). The initial value of the amount of control is, for example, the position of neutral in the case of tap position, and 0 in the case of reactive power. The initial value may also be a value commanded to use at a previous time. The proper voltage range of each section is also set in this operation. In such operation, the proper voltage range is a result obtained by conversion, into a high voltage, of the proper voltage range of each section stored in the storage unit 16. That is, the proper voltage range is, as described in the first embodiment, a proper voltage range determined using the estimation information and the monitoring point measurement information for each section and for each time range. Note that the monitoring process of the first embodiment is performed in parallel with the process illustrated in FIG. 13, thereby causing the proper voltage range to be periodically updated.

Next, the amount-of-control determination unit 52 estimates the voltage at each point of the power system based on the load power generation quantity (step S24). Specifically, the amount-of-control determination unit 52 calculates the power flow at the set amount of control to be applied by each voltage controller, based on the predicted value of the load power generation quantity obtained by correction at step S21 and on the facility information stored in the storage unit 16 to calculate the voltage at each point of the power distribution system. The facility information includes the connection location of each voltage controller, and the like. Note that the voltage management control device 50 may calculate the power flow at the amount of control to be applied by each voltage controller that has been set based on the load power generation quantity prediction information stored in the storage unit 16 without performing correction at step S21 to calculate the voltage at each point of the power distribution system.

Next, the amount-of-control determination unit 52 evaluates the power system using the evaluation function (step S25). Specifically, the amount-of-control determination unit 52 evaluates, based on the result of the power flow calculation, the value of the evaluation function, i.e., an objective function, that has been set up for each evaluation item with respect to the power distribution system to evaluate the power distribution system. In this operation, a first priority evaluation item is the amount of violation, i.e., the amount of deviation, from the proper voltage range of the voltage at each point of the power distribution system. That is, the optimum voltage distribution is determined to primarily minimize the sum of the amounts of violation from the proper voltage range of the voltage at respective points of the power distribution system.

In addition, a second priority evaluation item is, for example, the voltage margin, i.e., the margin value to an upper or lower voltage limit value of the proper voltage range, at each point of the power distribution system. A small voltage margin at each point of the power distribution system will result in deviation from the proper voltage range with a slight variation in voltage, thereby causing the voltage controller to frequently operate. Frequent operation of the voltage controller will cause frequent change in the tap position, thereby raising possibility of reduction of the life of the voltage controller. A small voltage margin may also cause deviation from the proper voltage range upon occurrence of short-term fluctuation in voltage caused by a sunlight power generation facility or the like. Accordingly, a greater sum of voltage margins is given higher evaluation. When an evaluation function is used that provides a minimum value in an optimum case, that is, when an evaluation function is used that indicates a more appropriate situation by a smaller output value, a voltage margin shortage amount defined as below is used to evaluate the voltage margin. The voltage margin shortage amount is calculated by Equation (9) below as 0 when the voltage margin is sufficiently large, and as greater for a smaller voltage margin.

Voltage margin shortage amount=(threshold)−(voltage margin) when voltage margin<threshold Voltage margin shortage amount=0 when voltage margin>=threshold  (9)

The threshold is set, for example, in the operation of setting an initial value at step S23. The threshold is set to, for example, about 20% of the range of the proper voltage range.

When the voltage margin is less than the threshold, and the voltage value falls within the proper voltage range, the voltage does not fall outside the proper voltage range, that is, there is no voltage violation. In such case, however, the voltage is in a state of voltage margin violation, that is, the voltage margin is insufficient for a short-term fluctuation. Accordingly, the voltage margin desirably satisfies a relationship of voltage margin>=threshold.

A third priority evaluation item can be the accumulated value of the amount of change from the initial setting value of the amount of control to be applied by the voltage controller. The amount of change from the initial setting value of the amount of control to be applied by the voltage controller is the difference from the initially-set tap position of the tap position in the case of voltage controller of a transformer type. Reducing the accumulated value of such amount, of change leads to reduction in the number of operations of the voltage controller.

In addition, a fourth priority evaluation item can be a power transmission loss (active power loss+reactive power loss) in the entire power distribution system. A smaller power transmission loss is given higher evaluation. Note that the active power loss accounts for most of the power transmission loss. A higher voltage results in a less loss, but accordingly leads to a smaller voltage margin with respect to the upper limit value at each point of the power distribution system, which is the second priority item. Thus, the power transmission loss is an evaluation item whose evaluation makes sense when the voltage margin is sufficient with respect to the upper and lower limit voltage values at each point of the power distribution system.

The evaluation function may be set up only for the first priority evaluation item, but can be set up for two or more items among the first through fourth priority evaluation items. In this case, a total evaluation function is used that provides a sum of weighted values of respective evaluation functions. In addition, a higher-order priority item may be included in the evaluation function depending on the power distribution system. The evaluation function can be configured such that, for example, optimization (high evaluation) will be achieved at a minimum output value.

For example, when an evaluation function is set up based on all the first through fourth priority evaluation items, the evaluation function can be determined as expressed by Equation (10) below, where $W_p$, $W_1$, $W_2$, and $W_3$ are weighting factors.

Evaluation function value

=Sum of amounts of violation with respect to upper or lower voltage limit at respective points of power distribution system $\times W_p$ +maximum value of upper-limit side voltage margin shortage amounts at respective points within voltage control coverage of each transformer $\times W_1$ +maximum value of lower-limit side voltage margin shortage amounts at respective points within voltage control coverage of each transformer $\times W_1$ +amount of change in target voltage of transformer relative to value at previous command $\times W_2$ +power transmission loss $\times W_3$ (10)

Note that a voltage controller of a transformer type, i.e., each transformer, has a voltage control coverage defined for each device. The voltage control coverage is a range on the distribution line 3-1 or 3-2, and is the range where the voltage controller assigned that range is responsive for controlling the voltage in that range. The voltage control coverage is, in general, a range from the location of installation of the voltage controller assigned that range to the next voltage controller downstream of that voltage controller. When the voltage controller has no downstream voltage controller, the termination end of the distribution line is the end point of the voltage control coverage. Note that the method of configuring a voltage control coverage is not limited to this example. The maximum value of the upper-limit side voltage margin shortage amounts at respective points within the voltage control coverage is the upper-limit side voltage margin value of the voltage margin values expressed by Equation (9) above at each point of the power distribution system in the voltage control coverage of each voltage controller. The maximum value of the lower-limit side voltage margin shortage amounts at respective points within the voltage control coverage is the lower-limit side voltage margin value of the voltage margin values expressed by Equation (9) above at each point of the power distribution system in the voltage control coverage of each voltage controller, After step S25, the amount-of-control determination unit S2 determines whether the amount-of-control determination unit 52 has made a search a predetermined number of times, that is, has changed the amount of control and performed the operations of steps S24 to S25 a predetermined number of times (step S26). When the amount-of-control determination unit 52 has not yet made a search the predetermined number of times (No at step S26), the amount-of-control determination unit 52 changes the amount of control to be applied by the voltage controller (step S27), and repeats the process from step S24. Note that the amount of control can be changed using a search algorithm for use in optimization problem or the like. When the amount-of-control determination unit 52 has made a search the predetermined number of times (Yes at step S26), the amount-of-control determination unit 52 determines an amount of control that optimizes the evaluation, function (step S28), and terminates the process. When the evaluation function expressed by Equation (10) above is used, the combination of amounts of control of the respective voltage controllers that minimizes the evaluation function is the set of amounts of control for optimizing the evaluation function.

Note that the foregoing evaluation function is merely by way of example. The evaluation function for use in determining the amounts of control is not limited to the foregoing example. In addition, the procedure for determining the amounts of control may be any method that can make a determination to cause the voltage at each monitoring point to fall within the proper voltage range obtained by conversion into a high voltage, and is not limited to the example illustrated in FIG. 13.

The amount-of-control determination unit 52 transmits control commands each including the amount of control determined by the above process to the voltage control devices 40 and 42 that control the corresponding voltage controllers.

As described above, a proper voltage range has been determined for each monitoring point, and the amount of control to be applied by each voltage controller is controlled in centralized voltage control to prevent deviation from the proper voltage range of the voltage at the monitoring point. An unmeasured point between monitoring points is not explicitly included in the points for evaluation in calculation of the optimum amount of control in centralized voltage control described above. Thus, similarly to the case of voltage monitoring described in the first embodiment, the proper voltage range is set by estimating a fixed value for the voltage drop quantity and for the voltage rise quantity in a section generated by segmentation between monitoring points. This may cause the proper voltage range to be set to a narrower range than needed. If the proper voltage range is too narrow, this may prevent obtaining of a solution in calculation of the amount of control described above. In such case, more voltage controllers need to be installed. In addition, the proper voltage range may be more appropriately set by increasing the number of monitoring points by installing more measurement devices for measuring the voltage of the distribution line 3, which is a high-voltage system. However, installing a measurement device in a high-voltage system is not easy, and also need cost for installation. In the present embodiment, the maximum rise quantity ΔVmax and the maximum drop quantity ΔVmin are estimated using measurement values of voltage measured by smart meters 7, and the proper voltage range is set using these estimation results. This can prevent overestimation of the voltage drop quantity or the voltage rise quantity in setting of the proper voltage range without additional installation of measurement devices in a high-voltage system. This can prevent a cost increase due to additional installation of voltage controllers.

In addition, recording a control command enables the control command and the voltage at a power receiving point of a consumer after the control command is sent can be reviewed, thereby enabling verification to be performed of whether the voltage at a power receiving point of a consumer has been maintained within a predetermined range after the control command is sent.

The configurations described in the foregoing embodiments are merely examples. These configurations may be combined with a known other technology, and configurations of different embodiments may be combined together. Moreover, part of such configurations may be omitted and/or modified without departing from the spirit thereof.

REFERENCE SIGNS LIST 1 voltage management device; 2 distribution transformer; 3-1, 3-2 distribution line; 4-1, 4-2 circuit breaker; 5, 5-1 to 5-3, 5-11 sensor-integrated switchgear; 6-1 to 6-3 pole-mounted transformer; 7-1 to 7-5 smart meter; 8-1 to 8-5 load; 9-2, 9-3, 9-5 power generation facility; 11 communication unit; 12 estimation information calculation unit; 13 voltage estimation unit; 14 proper voltage range update unit; 15 monitoring unit; 16 storage unit; 17 display unit; 20 first network; 21 second network; 30 meter data management device; 40, 42 voltage control device; 41 SVR; 50 voltage management control device; 51 load power generation quantity prediction unit; 52 amount-of-control determination unit.

The invention claimed is:

1. A voltage command device comprising:
acquisition circuitry to obtain, for each of sections in a power system, a measurement value of a voltage measured by a voltage measurement device connected to a corresponding one of the sections to measure a voltage at an interconnection point of a consumer, the sections being generated by segmentation between monitoring points, to obtain a measurement result from a measurement device that measures a voltage at one of the monitoring points, and to obtain a voltage measured by the measurement device, the measurement device that measures a voltage on a high-voltage distribution line being installed at each of the monitoring points;
voltage estimation circuitry to estimate, for each of the sections, a voltage drop quantity and a voltage rise quantity in the corresponding one of the sections using the voltage measured by the measurement device and using the measurement value;
proper voltage range update circuitry to set, for each of the sections, a value obtained by subtracting the voltage rise quantity from an upper limit value of a predetermined tolerance range as an upper limit value of a proper voltage range, and to set, for each of the sections, a value obtained by adding the voltage drop quantity to a lower limit value of the proper voltage range as a lower limit value of the proper voltage range; and
amount-of-control determination circuitry to determine an amount of control to be applied by a voltage controller that controls a voltage of the power system, using the voltage measured by the measurement device and using the proper voltage range of each of the sections, and to issue a command about the amount of control determined to a voltage control device that controls the voltage controller.

2. A power system monitoring system comprising:
a plurality of voltage measurement devices to measure a voltage at an interconnection point of a consumer; and
the voltage command device according to claim 1, wherein
the voltage command device obtains a measurement value of a voltage measured by the plurality of voltage measurement devices, and estimates, for each of sections, a voltage drop quantity and a voltage rise quantity in a corresponding one of the sections using a voltage measured by a measurement device and using the measurement value, the sections being generated by segmentation between monitoring points, the measurement device that measures a voltage on a high-voltage distribution line being installed at each of the monitoring points.

3. A power system monitoring system comprising:
a plurality of voltage measurement devices connected to a distribution line of a low-voltage system;
a plurality of measurement devices connected to a distribution line of a high-voltage system; and
the voltage command device according to claim 2, wherein
the voltage command device obtains a measurement value of a voltage measured by the plurality of voltage measurement devices, and estimates, for each of sections, a voltage drop quantity and a voltage rise quantity in a corresponding one of the sections using the voltage measured by the measurement device and using the measurement value, the sections being generated by segmentation between corresponding ones of the measurement devices in a power system.

4. A measurement device for measuring a voltage of a distribution line of a high-voltage system, wherein
the measurement device transmits a result of measurement of the voltage to the voltage management command device according to claim 1.

5. The voltage command device according to claim 1, wherein the voltage measurement device is a metering device that meters an amount of electricity.

6. The voltage command device according to claim 1, wherein the voltage drop quantity is a maximum value of a voltage drop quantity in each time range in the corresponding one of the sections, and the voltage rise quantity is a maximum value of a voltage rise quantity in each time range in the corresponding one of the sections.

7. The voltage command device according to claim 6, wherein the voltage command device comprises monitoring circuitry to determine, for each of the sections, whether the voltage measured by the measurement device falls outside the proper voltage range, the measurement device being disposed at one of the monitoring points located at an upstream end of the corresponding one of the sections, the proper voltage range being set by the proper voltage range update circuitry.

8. The voltage command device according to claim 7, comprising:

estimation information calculation circuitry to calculate, for each of the sections and for each time range, amounts of change in voltage from the one of the monitoring points in the corresponding one of the sections using a plurality of the measurement values obtained before a time of monitoring, to calculate a maximum rise quantity, to calculate a maximum drop quantity, and to calculate, using the maximum rise quantity and using a result of measurement of the voltage measured by the measurement device at a time and date corresponding to that maximum rise quantity, pieces of estimation information for respectively calculating a maximum rise quantity and a maximum drop quantity based on the voltage measured by the measurement device, the maximum rise quantity being a maximum value of the amounts of change associated with a voltage rise, the maximum drop quantity being a maximum value of the amounts of change associated with a voltage drop, wherein the voltage estimation circuitry calculates, for each of the sections, an estimated value of the voltage rise quantity and an estimated value of the voltage drop quantity in the corresponding one of the sections using the voltage measured by the measurement device at the time of monitoring and using the estimation information in a time range corresponding to the time of monitoring.

9. The voltage command device according to claim 8, wherein the estimation information includes a coefficient in an estimation equation for estimating a maximum rise quantity using a voltage measured by the measurement device disposed at a monitoring point at a downstream end of the corresponding one of the sections and using a voltage measured by the measurement device disposed at the monitoring point at the upstream end of the corresponding one of the sections, and a coefficient in an estimation equation for estimating a maximum drop quantity using a voltage measured by the measurement device disposed at a monitoring point at a termination end of the corresponding one of the sections and using a voltage measured by the measurement device disposed at the monitoring point at the upstream end of the corresponding one of the sections.

10. The voltage command device according to claim 8, wherein the measurement device also measures active power and reactive power on the high-voltage distribution line, and the estimation information includes a coefficient in an estimation equation for estimating a maximum rise quantity using a voltage, active power, and reactive power measured by the measurement device disposed at a monitoring point at a termination end of the corresponding one of the sections and using a voltage, active power, and reactive power measured by the measurement device disposed at the monitoring point at the upstream end of the corresponding one of the sections, and a coefficient in an estimation equation for estimating a maximum drop quantity using a voltage, active power, and reactive power measured by the measurement device disposed at the monitoring point at the termination end of the corresponding one of the sections and using a voltage, active power, and reactive power measured by the measurement device disposed at the monitoring point at the upstream end of the corresponding one of the sections.

11. The voltage command device according to claim 7, comprising:

a display to display the voltage drop quantity and the voltage rise quantity of each of the sections.

12. A voltage command method for use in a voltage command device, the voltage command method comprising:

obtaining, for each of sections in a power system, a measurement value of a voltage measured by a voltage measurement device connected to a corresponding one of the sections to measure a voltage at an interconnection point of a consumer, the sections being generated by segmentation between monitoring points, obtaining a measurement result from a measurement device that measures a voltage at one of the monitoring points, and obtaining a voltage measured by the measurement device, the measurement device that measures a voltage on a high-voltage distribution line being installed at each of the monitoring points;

estimating, for each of the sections, a voltage drop quantity and a voltage rise quantity in the corresponding one of the sections using the voltage measured by the measurement device and using the measurement value;

setting, for each of the sections, a value obtained by subtracting the voltage rise quantity from an upper limit value of a predetermined tolerance range as an upper limit value of a proper voltage range, and setting, for each of the sections, a value obtained by adding the voltage drop quantity to a lower limit value of the proper voltage range as a lower limit value of the proper voltage range; and determining an amount of control to be applied by a voltage controller that controls a voltage of the power system, by using the voltage measured by the measurement device and using the proper voltage range of each of the sections, and issuing a command about the amount of control determined to a voltage control device that controls the voltage controller.

13. A non-transitory storage medium storing a voltage command program for causing a computer system to perform:

obtaining, for each of sections in a power system, a measurement value of a voltage measured by a voltage measurement device connected to a corresponding one of the sections to measure a voltage at an interconnection point of a consumer, the sections being generated by segmentation between monitoring points, obtaining a measurement result from a measurement device that measures a voltage at one of the monitoring points, and obtaining a voltage measured by the measurement device, the measurement device that measures a voltage on a high-voltage distribution line being installed at each of the monitoring points; and estimating, for each of the sections, a voltage drop quantity and a voltage rise quantity in the corresponding one of the sections using the voltage measured by the measurement device and using the measurement value;

setting, for each of the sections, a value obtained by subtracting the voltage rise quantity from an upper limit value of a predetermined tolerance range as an upper limit value of a proper voltage range, and setting, for each of the sections, a value obtained by adding the voltage drop quantity to a lower limit value of the proper voltage range as a lower limit value of the proper voltage range; and determining an amount of control to be applied by a voltage controller that controls a voltage of the power system, by using the voltage measured by the measurement device and using the proper voltage range of each of the sections, and issuing a command about the amount of control determined to a voltage control device that controls the voltage controller.

* * * * *